US012709525B2

(12) United States Patent
Hao et al.

(10) Patent No.: US 12,709,525 B2
(45) Date of Patent: Aug. 18, 2026

(54) LEVELING SYSTEM FOR LIFT DEVICE

(71) Applicant: Oshkosh Corporation, Oshkosh, WI (US)

(72) Inventors: JiHong Hao, Greencastle, PA (US); Ignacy Puszkiewicz, Hagerstown, MD (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

(21) Appl. No.: 18/795,753

(22) Filed: Aug. 6, 2024

(65) Prior Publication Data

US 2024/0391742 A1 Nov. 28, 2024

Related U.S. Application Data

(63) Continuation of application No. 18/144,327, filed on May 8, 2023, now Pat. No. 12,091,298, which is a (Continued)

(51) Int. Cl.
*B66F 9/00* (2006.01)
*B60G 9/02* (2006.01)
(Continued)

(52) U.S. Cl.
CPC .................. *B66F 9/00* (2013.01); *B60G 9/02* (2013.01); *B60G 17/016* (2013.01);
(Continued)

(58) Field of Classification Search
CPC .......... B66F 9/00; B66F 5/04; B66F 9/07586; B66F 11/04; B66F 11/044; B66F 17/006;
(Continued)

(56) References Cited

U.S. PATENT DOCUMENTS 1,001,863 A 8/1911 Kirkwood
1,117,057 A 11/1914 Kohner
(Continued)

FOREIGN PATENT DOCUMENTS

CA 2478228 A1 2/2006
CN 204367811 6/2015
(Continued)

OTHER PUBLICATIONS

U.S. Appl. No. 15/351,285, filed Nov. 14, 2016, Oshkosh Corporation.

(Continued)

*Primary Examiner* — Karen Beck
(74) *Attorney, Agent, or Firm* — Foley & Lardner LLP

(57) ABSTRACT

A machine includes a base having a front end and a rear end, a first assembly pivotably coupled to the front end of the base and including a first tractive element, a second assembly pivotably coupled to the rear end of the base and including a second tractive element, a first actuator coupled to a frontmost wall of the front end of the base and the first assembly, and a second actuator coupled to a rearmost wall of the rear end of the base and the second assembly.

6 Claims, 17 Drawing Sheets

Related U.S. Application Data continuation of application No. 17/464,897, filed on Sep. 2, 2021, now Pat. No. 11,679,967, which is a continuation of application No. 16/525,080, filed on Jul. 29, 2019, now Pat. No. 11,111,120, which is a continuation of application No. 15/880,267, filed on Jan. 25, 2018, now Pat. No. 10,407,288, which is a continuation of application No. 15/482,601, filed on Apr. 7, 2017, now Pat. No. 9,890,024.

(60) Provisional application No. 62/320,280, filed on Apr. 8, 2016.

(51) Int. Cl.

| | |
|---|---|
| ***B60G 17/016*** | (2006.01) |
| ***B60G 21/00*** | (2006.01) |
| ***B60P 1/34*** | (2006.01) |
| ***B60P 3/12*** | (2006.01) |
| ***B66C 9/00*** | (2006.01) |
| ***B66C 23/00*** | (2006.01) |
| ***B66F 5/04*** | (2006.01) |
| ***B66F 9/065*** | (2006.01) |
| ***B66F 9/075*** | (2006.01) |
| ***B66F 11/04*** | (2006.01) |
| ***B66F 13/00*** | (2006.01) |
| ***B66F 17/00*** | (2006.01) |
| ***E01B 27/17*** | (2006.01) |
| ***E02F 9/02*** | (2006.01) |

(52) U.S. Cl.

CPC .............. *B60G 21/007* (2013.01); *B60P 1/34* (2013.01); *B66C 9/00* (2013.01); *B66F 5/04* (2013.01); *B66F 9/065* (2013.01); *B66F 9/07586* (2013.01); *B66F 11/04* (2013.01); *B66F 11/044* (2013.01); *B66F 13/00* (2013.01); *E01B 27/17* (2013.01); *E02F 9/02* (2013.01); *B60G 2202/413* (2013.01); *B60G 2300/022* (2013.01); *B60G 2400/0511* (2013.01); *B60G 2400/0512* (2013.01); *B60G 2400/252* (2013.01); *B60G 2400/60* (2013.01); *B60G 2500/30* (2013.01); *B60G 2800/012* (2013.01); *B60G 2800/014* (2013.01); *B60P 3/125* (2013.01); *B66C 23/54* (2013.01); *B66F 9/0655* (2013.01); *B66F 17/006* (2013.01)

(58) Field of Classification Search

CPC .. B60G 9/02; B60G 21/007; B60G 2202/413; B60G 2400/0511; B60G 2400/0512; B60G 2400/252; B60G 2800/012; B60G 2800/014; B60P 1/34; E01B 27/17; B66C 23/54

See application file for complete search history.

(56) References Cited

U.S. PATENT DOCUMENTS 1,278,460 A 9/1918 Hanger
1,376,467 A 5/1921 Simmon
1,409,849 A 3/1922 Haeberlein
1,463,569 A 7/1923 Bathrick
1,560,477 A 11/1925 Kessler
1,835,132 A 12/1931 Anania
2,254,261 A 9/1941 Best
2,332,161 A 10/1943 Mcintyre et al.
2,526,245 A 10/1950 Lathrop
2,600,462 A 6/1952 Bateman
2,613,954 A 10/1952 Avila
2,628,127 A 2/1953 Palsgrove
2,632,577 A 3/1953 Sacco
2,662,478 A 12/1953 Surre
2,736,332 A 2/1956 Simmons
2,811,347 A 10/1957 Cass
2,828,969 A 4/1958 Hoffman
2,840,368 A 6/1958 Chayne et al.
2,907,575 A 10/1959 Locker
2,916,997 A 12/1959 Terrie
2,948,549 A 8/1960 Schultz
2,997,242 A 8/1961 Grosholz
3,010,533 A 11/1961 Ross
3,039,788 A 6/1962 Farago
3,053,270 A 9/1962 Campbell
3,083,790 A 4/1963 Mcafee et al.
3,085,817 A 4/1963 Krause et al.
3,131,963 A 5/1964 Schilberg
3,146,839 A 9/1964 Carlson
3,150,778 A 9/1964 Elias
3,188,966 A 6/1965 Tetlow
3,241,620 A 3/1966 Brudnak
3,306,390 A 2/1967 Jamme
3,315,815 A 4/1967 Wittek
3,395,672 A 8/1968 Ruf
3,397,897 A 8/1968 Schultze
3,399,882 A 9/1968 Hausmann
3,500,961 A 3/1970 Eberhardt et al.
3,574,435 A 4/1971 Barroero
3,590,948 A 7/1971 Milner, Jr.
3,601,426 A 8/1971 Hury
3,603,613 A 9/1971 Erdmann
3,605,566 A 9/1971 Vetter
3,614,125 A 10/1971 Sinclair et al.
3,615,081 A 10/1971 Ravenel
3,620,603 A 11/1971 George et al.
3,661,060 A 5/1972 Bowen
3,664,704 A 5/1972 Ellis
3,668,978 A 6/1972 Bowen
3,692,295 A 9/1972 Cass et al.
3,715,174 A 2/1973 Davis et al.
3,726,308 A 4/1973 Eberhardt
3,727,385 A 4/1973 Twidale et al.
3,778,082 A 12/1973 Grosseau
3,795,291 A 3/1974 Naito et al.
3,807,788 A 4/1974 Radek
3,848,758 A 11/1974 Carter
3,865,661 A 2/1975 Hata et al.
3,881,767 A 5/1975 Klees
3,913,939 A 10/1975 Sinclair et al.
3,917,307 A 11/1975 Shoebridge
3,938,665 A 2/1976 Rumble
3,941,403 A 3/1976 Hiruma
3,981,405 A 9/1976 Slack
4,037,664 A 7/1977 Gibson
4,056,194 A 11/1977 Radek
4,059,170 A 11/1977 Young
4,084,522 A 4/1978 Younger
4,094,532 A 6/1978 Johnson et al.
4,103,757 A 8/1978 McVaugh
4,153,237 A 5/1979 Supalla
4,157,733 A 6/1979 Ewers et al.
4,159,105 A 6/1979 Vander Laan et al.
4,160,492 A 7/1979 Johnston
4,172,591 A 10/1979 Craig
4,185,924 A 1/1980 Graham
4,234,205 A 11/1980 Thiesce
4,241,803 A 12/1980 Lauber
4,270,771 A 6/1981 Fujii
4,326,445 A 4/1982 Bemiss
4,337,830 A 7/1982 Eberhardt
4,373,600 A 2/1983 Buschbom et al.
4,395,191 A * 7/1983 Kaiser .................... E02F 9/085 180/7.1
4,430,048 A 2/1984 Fritsch
4,447,073 A 5/1984 Brandstadter
4,456,093 A 6/1984 Finley et al.
4,491,342 A 1/1985 Aubry
4,492,282 A 1/1985 Appelblatt et al.
4,544,180 A 10/1985 Maru et al.
4,558,758 A * 12/1985 Littman ................ B66F 11/046 182/2.11

(56) References Cited

U.S. PATENT DOCUMENTS 4,558,759 A 12/1985 Baatrup et al.
4,563,124 A 1/1986 Eskew
4,586,743 A 5/1986 Edwards et al.
4,587,862 A 5/1986 Hoffman
4,616,810 A 10/1986 Richardson et al.
4,625,995 A 12/1986 Aubry et al.
4,632,422 A 12/1986 Csordas et al.
4,655,307 A 4/1987 Lamoureux
4,659,104 A 4/1987 Tanaka et al.
4,669,744 A 6/1987 Sano et al.
4,696,489 A 9/1987 Fujishiro et al.
4,705,295 A 11/1987 Fought
4,720,085 A 1/1988 Shinbori et al.
4,732,420 A 3/1988 O'Neil et al.
4,733,876 A 3/1988 Heider et al.
4,735,402 A 4/1988 Davis
4,743,000 A 5/1988 Karnopp
4,781,535 A 11/1988 Frawley et al.
4,802,561 A 2/1989 Knecht et al.
4,811,804 A 3/1989 Ewers et al.
4,826,141 A 5/1989 Buma et al.
4,834,418 A 5/1989 Buma et al.
4,881,876 A 11/1989 Laziou
4,883,289 A 11/1989 Sardou
4,926,954 A 5/1990 Ataka et al.
4,945,780 A 8/1990 Bosma
4,958,850 A 9/1990 Buma et al.
4,960,188 A 10/1990 Wossner
5,004,156 A 4/1991 Montanier
5,010,971 A 4/1991 Hamada et al.
5,020,783 A 6/1991 Schroder et al.
5,021,917 A 6/1991 Pike et al.
5,028,088 A 7/1991 Del Monico et al.
5,040,823 A 8/1991 Lund
5,071,158 A 12/1991 Yonekawa et al.
5,076,597 A 12/1991 Korekane et al.
5,078,241 A 1/1992 Ackermann et al.
5,080,392 A 1/1992 Bazergui
5,111,901 A 5/1992 Bachhuber et al.
5,112,183 A * 5/1992 Nusbaum ............ B66F 9/07545 414/544
5,113,946 A 5/1992 Cooper
5,137,101 A 8/1992 Schaeff
5,137,292 A 8/1992 Eisen
5,139,104 A 8/1992 Moscicki
5,158,614 A 10/1992 Takeuchi
5,159,989 A 11/1992 Claxton
5,161,653 A 11/1992 Hare, Sr.
5,163,701 A 11/1992 Cromley, Jr.
5,165,707 A 11/1992 Morimanno et al.
5,188,390 A 2/1993 Clark
5,188,515 A 2/1993 Horn
5,195,772 A 3/1993 Bachrach et al.
5,209,003 A 5/1993 Maxfield et al.
5,211,245 A 5/1993 Relyea et al.
5,217,083 A 6/1993 Bachhuber et al.
5,258,893 A 11/1993 Finneyfrock
5,295,563 A 3/1994 Bennett
5,301,756 A 4/1994 Relyea et al.
5,322,321 A 6/1994 Yopp
5,326,128 A 7/1994 Cromley, Jr.
5,326,229 A 7/1994 Collins
5,327,989 A 7/1994 Furuhashi et al.
5,328,004 A 7/1994 Fannin et al.
5,346,334 A 9/1994 Einaru et al.
5,368,317 A 11/1994 McCombs et al.
5,378,010 A 1/1995 Marino et al.
5,390,945 A 2/1995 Orr
5,397,005 A 3/1995 Taccolini
5,400,880 A 3/1995 Ryan
5,409,254 A 4/1995 Minor et al.
5,417,299 A 5/1995 Pillar et al.
5,438,908 A 8/1995 Madden, Jr.
5,454,698 A 10/1995 Yokoi
5,467,827 A 11/1995 McLoughlin
5,487,323 A 1/1996 Madden, Jr.
5,501,288 A 3/1996 Ducote
5,520,376 A 5/1996 Langa et al.
5,533,781 A 7/1996 Williams
5,538,185 A 7/1996 Rabitsch et al.
5,553,673 A 9/1996 Hackman
5,586,627 A 12/1996 Nezu et al.
5,586,781 A 12/1996 Anderson
5,617,696 A 4/1997 Young
5,639,119 A 6/1997 Plate et al.
5,663,520 A 9/1997 Ladika et al.
5,670,734 A 9/1997 Middione et al.
5,679,918 A 10/1997 Korpi et al.
5,687,960 A 11/1997 Moon
5,711,139 A 1/1998 Swanson
5,738,229 A 4/1998 Fairweather
5,746,396 A 5/1998 Thorton-Trump
5,752,862 A 5/1998 Mohler et al.
5,785,372 A 7/1998 Glatzmeier et al.
5,788,158 A 8/1998 Relyea
5,794,966 A 8/1998 MacLeod
5,807,056 A 9/1998 Osborn et al.
5,813,697 A 9/1998 Bargenquast et al.
5,826,663 A 10/1998 Sundholm
5,836,657 A 11/1998 Tilley et al.
5,839,664 A 11/1998 Relyea
RE36,196 E 4/1999 Eberhardt
5,899,276 A 5/1999 Relyea et al.
5,905,225 A 5/1999 Joynt
5,909,780 A 6/1999 De Andrade
5,915,728 A 6/1999 Blackburn
5,915,775 A 6/1999 Martin et al.
5,919,240 A 7/1999 Ney et al.
5,924,528 A 7/1999 Vermolen et al.
5,934,696 A 8/1999 Bloser et al.
5,951,235 A 9/1999 Young et al.
5,954,364 A 9/1999 Nechushtan
5,957,252 A 9/1999 Berthold
5,996,748 A 12/1999 Nezu et al.
6,009,953 A 1/2000 Laskaris et al.
6,015,155 A 1/2000 Brookes et al.
6,029,958 A 2/2000 Larsson et al.
6,036,201 A 3/2000 Pond et al.
6,086,060 A 7/2000 Berthold
6,086,074 A 7/2000 Braun
6,105,984 A 8/2000 Schmitz et al.
6,109,684 A 8/2000 Reitnouer
6,119,829 A 9/2000 Nakadate
6,120,009 A 9/2000 Gatehouse et al.
6,131,685 A 10/2000 Sakamoto et al.
6,155,351 A 12/2000 Breedlove et al.
6,161,662 A 12/2000 Johnston et al.
6,161,845 A 12/2000 Shono et al.
6,206,391 B1 3/2001 Speth et al.
6,220,532 B1 4/2001 Manon et al.
6,254,067 B1 7/2001 Yih
6,264,212 B1 7/2001 Timoney
6,269,918 B1 8/2001 Kurusu et al.
6,270,098 B1 8/2001 Heyring et al.
6,270,153 B1 8/2001 Toyao et al.
6,289,995 B1 9/2001 Fuller
6,302,248 B1 10/2001 Nakadate
6,305,512 B1 10/2001 Heinz et al.
6,311,795 B1 11/2001 Skotnikov et al.
6,315,515 B1 11/2001 Young et al.
6,318,742 B2 11/2001 Franzini
6,327,960 B1 12/2001 Heimueller et al.
6,336,783 B1 1/2002 Young et al.
6,357,769 B1 3/2002 Omundson et al.
6,371,262 B1 4/2002 Katou et al.
6,394,007 B2 5/2002 Lewis et al.
6,394,534 B1 5/2002 Dean
6,398,236 B1 6/2002 Richardson
6,398,478 B2 6/2002 Smith et al.
6,412,759 B1 7/2002 Krauss
6,421,593 B1 7/2002 Kempen et al.
6,435,071 B1 8/2002 Campbell
6,435,298 B1 8/2002 Mizuno et al.
6,443,687 B1 9/2002 Kaiser

(56) References Cited

U.S. PATENT DOCUMENTS 6,446,944 B1 9/2002 Ward
6,447,073 B1 9/2002 Goettker
6,447,239 B2 9/2002 Young et al.
6,460,907 B2 10/2002 Usui
6,477,455 B2 11/2002 Panizzolo
6,516,914 B1 2/2003 Andersen et al.
6,527,093 B2 3/2003 Oliver et al.
6,527,494 B2 3/2003 Hurlburt
6,553,290 B1 4/2003 Pillar
6,554,305 B2 4/2003 Fulks
6,557,917 B1 5/2003 Colcombe
6,561,718 B1 5/2003 Archer et al.
6,565,305 B2 5/2003 Schrafel
6,575,484 B2 6/2003 Rogala et al.
6,582,206 B2 6/2003 Schluecker
6,584,385 B1 6/2003 Ford et al.
6,595,330 B1 7/2003 Henrickson et al.
6,619,673 B2 9/2003 Eckelberry et al.
6,622,397 B1 9/2003 Knoble
6,623,020 B1 9/2003 Satou
6,634,445 B2 10/2003 Dix et al.
6,658,984 B2 12/2003 Zonak
6,692,366 B1 2/2004 Savant
6,695,328 B2 2/2004 Cope
6,702,058 B2 3/2004 Ishii et al.
6,712,759 B2 3/2004 Muller
6,715,744 B2 4/2004 Bell
6,725,983 B2 4/2004 Bell
6,736,232 B1 5/2004 Bergstrom et al.
6,757,597 B2 6/2004 Yakes et al.
6,764,085 B1 7/2004 Anderson
6,769,733 B2 8/2004 Seksaria et al.
6,779,806 B1 8/2004 Breitbach et al.
6,820,908 B1 11/2004 Tousi et al.
6,845,988 B2 1/2005 Romer et al.
6,848,693 B2 2/2005 Schneider
6,869,089 B2 3/2005 Lee
6,880,684 B1 4/2005 Evans et al.
6,883,815 B2 4/2005 Archer
6,885,920 B2 4/2005 Yakes et al.
6,899,191 B1 5/2005 Lykken
6,909,944 B2 6/2005 Pillar et al.
6,918,481 B2 7/2005 Quigley et al.
6,918,721 B2 7/2005 Venton-Walters et al.
6,922,615 B2 7/2005 Pillar et al.
6,923,453 B2 8/2005 Pivac
6,925,735 B2 8/2005 Hamm et al.
6,938,749 B1 9/2005 Quigley et al.
6,959,466 B2 11/2005 Alowonle et al.
6,974,003 B1 12/2005 Acker et al.
6,976,688 B2 12/2005 Archer et al.
6,978,872 B2 12/2005 Turner
6,983,968 B2 1/2006 Brauer et al.
6,993,421 B2 1/2006 Pillar et al.
7,024,296 B2 4/2006 Squires et al.
7,060,422 B2 6/2006 Biberger et al.
7,070,382 B2 7/2006 Pruteanu et al.
7,072,745 B2 7/2006 Pillar et al.
7,107,129 B2 9/2006 Rowe et al.
7,108,253 B2 9/2006 Venton-Walters et al.
7,114,764 B1 10/2006 Barsoum et al.
7,124,865 B2 10/2006 Turner et al.
7,127,331 B2 10/2006 Pillar et al.
7,140,461 B2 11/2006 Morrow
7,144,039 B2 12/2006 Kawasaki et al.
7,153,286 B2 12/2006 Busby et al.
RE39,477 E 1/2007 Nellers et al.
7,162,332 B2 1/2007 Pillar et al.
7,164,977 B2 1/2007 Yakes et al.
7,184,662 B2 2/2007 Arbel et al.
7,184,862 B2 2/2007 Pillar et al.
7,184,866 B2 2/2007 Squires et al.
7,188,893 B2 3/2007 Akasaka
7,191,877 B2 3/2007 Norgaard et al.
7,198,130 B2 4/2007 Schimke
7,198,278 B2 4/2007 Donaldson
7,207,582 B2 4/2007 Siebers et al.
7,213,872 B2 5/2007 Ronacher et al.
7,234,534 B2 6/2007 Froland et al.
7,240,906 B2 7/2007 Klees
7,246,835 B1 7/2007 Colburn et al.
7,252,181 B2 8/2007 Lemmens
7,252,191 B2 8/2007 Ozaki et al.
7,254,468 B2 8/2007 Pillar et al.
7,261,194 B2 8/2007 Fox
7,267,394 B1 9/2007 Mouch et al.
7,270,346 B2 9/2007 Rowe et al.
7,274,976 B2 9/2007 Rowe et al.
7,277,782 B2 10/2007 Yakes et al.
7,281,600 B2 10/2007 Chernoff et al.
7,284,633 B2 10/2007 Bordini
7,302,320 B2 11/2007 Nasr et al.
7,306,069 B2 12/2007 Takeshima et al.
7,320,387 B2 1/2008 Sendrea
7,325,660 B2 2/2008 Norgaard et al.
7,357,203 B2 4/2008 Morrow et al.
7,377,549 B2 5/2008 Hasegawa et al.
7,379,797 B2 5/2008 Nasr et al.
7,380,800 B2 6/2008 Klees
7,393,016 B2 7/2008 Mitsui et al.
7,406,909 B2 8/2008 Shah et al.
7,412,307 B2 8/2008 Pillar et al.
7,419,021 B2 9/2008 Morrow et al.
7,425,891 B2 9/2008 Colburn et al.
7,439,711 B2 10/2008 Bolton
7,441,615 B2 10/2008 Borroni-Bird et al.
7,441,809 B1 10/2008 Coombs et al.
7,448,460 B2 11/2008 Morrow et al.
7,472,914 B2 1/2009 Anderson et al.
7,489,098 B2 2/2009 Harris et al.
7,494,169 B2 2/2009 Collins
7,497,308 B2 3/2009 McAndrews
7,510,235 B2 3/2009 Kobayashi et al.
7,520,354 B2 4/2009 Morrow et al.
7,522,979 B2 4/2009 Pillar
7,555,369 B2 6/2009 Pillar et al.
7,559,735 B2 7/2009 Pruteanu et al.
7,562,750 B2 7/2009 Lemmens et al.
7,566,063 B2 7/2009 Oki et al.
7,594,561 B2 9/2009 Hass et al.
7,611,153 B2 11/2009 Kim et al.
7,611,154 B2 11/2009 Delaney
7,618,063 B2 11/2009 Takeshima et al.
7,621,580 B2 11/2009 Randjelovic et al.
7,624,835 B2 12/2009 Bowers
7,624,995 B2 12/2009 Barbison
7,628,259 B2 12/2009 Norgaard et al.
7,644,942 B2 1/2010 Bordini et al.
7,651,106 B2 1/2010 Vortmeyer
7,671,547 B2 3/2010 Addleman
7,681,892 B1 3/2010 Crews et al.
7,686,335 B2 3/2010 Kasubke
7,689,332 B2 3/2010 Yakes et al.
7,695,053 B1 4/2010 Boczek et al.
7,699,385 B2 4/2010 Kurata
7,711,460 B2 5/2010 Yakes et al.
7,715,962 B2 5/2010 Rowe et al.
7,725,225 B2 5/2010 Pillar et al.
7,726,429 B2 6/2010 Suzuki
7,726,688 B2 6/2010 Setina
7,729,831 B2 6/2010 Pillar et al.
7,757,805 B2 7/2010 Wakuta et al.
7,770,506 B2 8/2010 Johnson et al.
7,789,010 B2 9/2010 Allor et al.
7,792,618 B2 9/2010 Quigley et al.
7,798,508 B2 9/2010 Wettlaufer, Jr.
7,802,816 B2 9/2010 McGuire
7,823,895 B2 11/2010 Wagne
7,828,328 B2 11/2010 Hulscher et al.
7,835,838 B2 11/2010 Pillar et al.
7,848,857 B2 12/2010 Nasr et al.
7,856,998 B2 12/2010 Bauer
7,874,373 B2 1/2011 Morrow et al.
7,878,750 B2 2/2011 Zhou et al.

(56) References Cited

U.S. PATENT DOCUMENTS 7,905,534 B2 3/2011 Boczek et al.
7,905,540 B2 3/2011 Kiley et al.
7,908,959 B2 3/2011 Pavon
7,909,561 B2 3/2011 Addleman et al.
7,931,103 B2 4/2011 Morrow et al.
7,934,766 B2 5/2011 Boczek et al.
7,938,478 B2 5/2011 Kamimae
7,950,675 B1 5/2011 Quenzi et al.
7,963,204 B2 6/2011 Venton-Walters et al.
7,997,182 B1 8/2011 Cox
8,000,850 B2 8/2011 Nasr et al.
8,029,021 B2 10/2011 Leonard et al.
8,033,208 B2 10/2011 Joynt et al.
8,095,247 B2 1/2012 Pillar et al.
8,096,225 B1 1/2012 Johnson et al.
8,139,109 B2 3/2012 Schmiedel et al.
8,146,477 B2 4/2012 Joynt
8,146,478 B2 4/2012 Joynt et al.
8,182,194 B2 5/2012 Pruteanu et al.
8,197,231 B2 6/2012 Orr
8,204,650 B2 6/2012 Kesselgruber et al.
8,205,703 B2 6/2012 Halliday
8,206,338 B2 6/2012 Childers et al.
8,333,390 B2 12/2012 Linsmeier et al.
8,360,706 B2 1/2013 Addleman et al.
8,376,077 B2 2/2013 Venton-Walters
8,376,719 B2 2/2013 Grady et al.
8,402,878 B2 3/2013 Schreiner et al.
8,413,567 B2 4/2013 Luther et al.
8,413,568 B2 4/2013 Kosheleff
8,424,443 B2 4/2013 Gonzalez
8,430,196 B2 4/2013 Halliday
8,459,619 B2 6/2013 Trinh et al.
8,465,025 B2 6/2013 Venton-Walters et al.
8,479,894 B2 7/2013 Yabe
8,534,412 B2 9/2013 Huhn et al.
8,540,475 B2 9/2013 Kuriakose et al.
8,561,735 B2 10/2013 Morrow et al.
8,567,576 B2 10/2013 Ripa
8,578,834 B2 11/2013 Tunis et al.
8,584,818 B2 11/2013 Murakami
8,596,183 B2 12/2013 Coltrane
8,596,648 B2 12/2013 Venton-Walters et al.
8,601,931 B2 12/2013 Naroditsky et al.
8,616,617 B2 12/2013 Sherbeck et al.
8,725,355 B2 5/2014 Quick
8,739,892 B2 6/2014 Moore et al.
8,746,741 B2 6/2014 Gonzalez
8,764,029 B2 7/2014 Venton-Walters et al.
8,764,059 B2 7/2014 Borghi
8,794,886 B1 8/2014 Nett et al.
8,800,729 B2 8/2014 Yabe et al.
8,801,017 B2 8/2014 Ellifson et al.
8,801,318 B2 8/2014 Knoble et al.
8,807,613 B2 8/2014 Howell et al.
8,813,981 B2 8/2014 Ethington
8,821,130 B2 9/2014 Venton-Walters et al.
8,863,884 B2 10/2014 Jacob-Lloyd
8,876,133 B2 11/2014 Ellifson
8,943,946 B1 2/2015 Richmond et al.
8,947,531 B2 2/2015 Fischer et al.
8,955,859 B1 2/2015 Richmond et al.
8,955,880 B2 2/2015 Malcolm et al.
8,967,699 B1 3/2015 Richmond et al.
8,991,834 B2 3/2015 Venton-Walters et al.
8,991,840 B2 3/2015 Zuleger et al.
9,008,913 B1 4/2015 Sears et al.
9,016,703 B2 4/2015 Rowe et al.
9,033,165 B2 5/2015 Aus et al.
9,045,014 B1 6/2015 Verhoff et al.
9,114,804 B1 8/2015 Shukla et al.
9,127,738 B2 9/2015 Ellifson et al.
9,132,770 B2 9/2015 Amsley et al.
9,139,409 B2 9/2015 Perron
9,174,686 B1 11/2015 Messina et al.
9,216,856 B2 12/2015 Howell et al.
9,221,496 B2 12/2015 Barr et al.
9,223,302 B2 12/2015 Maurer
9,249,002 B2 2/2016 Bowden
9,291,230 B2 3/2016 Ellifson et al.
9,302,129 B1 4/2016 Betz et al.
9,315,210 B2 4/2016 Sears et al.
9,327,150 B2 5/2016 Moore et al.
9,327,576 B2 5/2016 Ellifson
9,328,986 B1 5/2016 Pennau et al.
9,329,000 B1 5/2016 Richmond et al.
9,387,985 B2 7/2016 Gillmore et al.
9,409,471 B2 8/2016 Hoppe et al.
9,434,321 B2 9/2016 Perron et al.
9,656,640 B1 5/2017 Verhoff et al.
9,669,679 B2 6/2017 Zuleger et al.
9,688,112 B2 6/2017 Venton-Walters et al.
9,890,024 B2 2/2018 Hao et al.
10,221,055 B2 3/2019 Hao et al.
10,532,722 B1 1/2020 Betz et al.
2001/0024021 A1 9/2001 Allen et al.
2001/0038796 A1 11/2001 Schluecker
2001/0043872 A1 11/2001 Schluecker
2002/0002431 A1 1/2002 Panizzolo
2002/0093153 A1 7/2002 Scotese et al.
2002/0108827 A1 8/2002 Oliver et al.
2002/0129696 A1 9/2002 Pek et al.
2002/0130771 A1 9/2002 Osborne et al.
2002/0153183 A1 10/2002 Puterbaugh et al.
2002/0190516 A1 12/2002 Henksmeier et al.
2003/0001346 A1 1/2003 Hamilton et al.
2003/0011180 A1 1/2003 Coffman et al.
2003/0110939 A1 6/2003 Able et al.
2003/0155164 A1 8/2003 Mantini et al.
2003/0205891 A1 11/2003 Nass
2003/0230863 A1 12/2003 Archer
2003/0236606 A1 12/2003 Lu et al.
2004/0113377 A1 6/2004 Klees
2004/0149500 A1 8/2004 Chernoff et al.
2004/0178018 A1 9/2004 Christenson
2004/0195133 A1 10/2004 Duncan et al.
2005/0001400 A1 1/2005 Archer et al.
2005/0034911 A1 2/2005 Darby
2005/0062239 A1 3/2005 Shore
2005/0062249 A1 3/2005 Lemmens et al.
2005/0093265 A1 5/2005 Niaura et al.
2005/0099885 A1 5/2005 Tamminga
2005/0110229 A1 5/2005 Kimura et al.
2005/0132873 A1 6/2005 Diaz Supisiche et al.
2005/0140129 A1 6/2005 Miki et al.
2005/0161891 A1 7/2005 Trudeau et al.
2005/0196269 A1 9/2005 Racer et al.
2005/0226707 A1 10/2005 Quenzi et al.
2005/0284682 A1 12/2005 Hass et al.
2006/0021541 A1 2/2006 Siebers et al.
2006/0032701 A1 2/2006 Linsmeier et al.
2006/0032702 A1 2/2006 Linsmeier et al.
2006/0055129 A1 3/2006 Amano
2006/0082079 A1 4/2006 Eichhorn et al.
2006/0086566 A1 4/2006 Linsmeier et al.
2006/0192354 A1 8/2006 Van Cayzeele
2006/0192361 A1 8/2006 Anderson et al.
2006/0225979 A1 10/2006 Quinn et al.
2006/0244225 A1 11/2006 Power et al.
2006/0273566 A1 12/2006 Hepner et al.
2006/0290125 A1 12/2006 Kasubke
2007/0056280 A1 3/2007 Bitter
2007/0077156 A1 4/2007 Orr
2007/0088469 A1 4/2007 Schmiedel et al.
2007/0102963 A1 5/2007 Frederick et al.
2007/0120334 A1 5/2007 Holbrook
2007/0158920 A1 7/2007 Delaney
2007/0186762 A1 8/2007 Dehart et al.
2007/0234896 A1 10/2007 Joynt
2007/0246902 A1 10/2007 Trudeau et al.
2008/0017426 A1 1/2008 Walters et al.
2008/0017434 A1 1/2008 Harper et al.
2008/0034953 A1 2/2008 Barbe et al.
2008/0053739 A1 3/2008 Chernoff et al.

(56) References Cited

U.S. PATENT DOCUMENTS

2008/0066613 A1 3/2008 Mills et al.
2008/0099213 A1 5/2008 Morrow et al.
2008/0231011 A1 9/2008 Bordini et al.
2008/0231012 A1 9/2008 Rach et al.
2008/0252025 A1 10/2008 Plath
2008/0284118 A1 11/2008 Venton-Walters et al.
2009/0001761 A1 1/2009 Yasuhara et al.
2009/0033044 A1 2/2009 Linsmeier
2009/0061702 A1 3/2009 March
2009/0095585 A1 4/2009 Lassus et al.
2009/0174158 A1 7/2009 Anderson et al.
2009/0294231 A1 12/2009 Carlson et al.
2010/0019538 A1 1/2010 Kiley et al.
2010/0026046 A1 2/2010 Mendoza et al.
2010/0032932 A1 2/2010 Hastings
2010/0116569 A1 5/2010 Morrow et al.
2010/0163330 A1 7/2010 Halliday
2010/0163357 A1 7/2010 Hunter
2010/0187864 A1 7/2010 Tsuchida
2010/0218667 A1 9/2010 Naroditsky et al.
2010/0264636 A1 10/2010 Fausch et al.
2010/0307328 A1 12/2010 Hoadley et al.
2010/0307329 A1 12/2010 Kaswen et al.
2010/0308516 A1 12/2010 Galasso et al.
2010/0319525 A1 12/2010 Pavon
2011/0011078 A1 1/2011 Kamen et al.
2011/0017557 A1 1/2011 Nygren et al.
2011/0042869 A1 2/2011 Runkel
2011/0049818 A1 3/2011 Van Der Knaap et al.
2011/0057066 A1 3/2011 Hayashi et al.
2011/0060502 A1 3/2011 Atz et al.
2011/0068606 A1 3/2011 Klimek et al.
2011/0079134 A1 4/2011 Jacquemont et al.
2011/0079978 A1 4/2011 Schreiner et al.
2011/0089658 A1 4/2011 Buhl et al.
2011/0108590 A1 5/2011 Kennedy et al.
2011/0114409 A1 5/2011 Venton-Walters
2011/0169240 A1 7/2011 Schreiner et al.
2011/0221233 A1 9/2011 Damsi
2011/0266838 A1 11/2011 Leopold
2011/0314999 A1 12/2011 Luther et al.
2012/0049470 A1 3/2012 Rositch et al.
2012/0049570 A1 3/2012 Aizik
2012/0097019 A1 4/2012 Sherbeck et al.
2012/0098215 A1 4/2012 Rositch et al.
2012/0111180 A1 5/2012 Johnson et al.
2012/0174767 A1 7/2012 Naroditsky et al.
2012/0234638 A1 9/2012 Ellifson et al.
2012/0282077 A1 11/2012 Alberts et al.
2012/0325041 A1 12/2012 Sakuma
2013/0009423 A1 1/2013 Yamamoto et al.
2013/0093154 A1 4/2013 Cordier et al.
2013/0205984 A1 8/2013 Henker et al.
2013/0241237 A1 9/2013 Dziuba et al.
2013/0249175 A1 9/2013 Ellifson
2013/0249183 A1 9/2013 Ellifson et al.
2013/0251485 A1 9/2013 Howell et al.
2013/0263729 A1 10/2013 Johnson et al.
2013/0264784 A1 10/2013 Venton-Walters et al.
2013/0312595 A1 11/2013 Lee
2014/0000235 A1 1/2014 Kamen et al.
2014/0060304 A1 3/2014 Harmon et al.
2014/0131969 A1 5/2014 Rowe et al.
2014/0151142 A1 6/2014 Hoppe et al.
2014/0238704 A1 8/2014 Moore et al.
2014/0251726 A1 9/2014 Ditty et al.
2014/0251742 A1 9/2014 Dillman et al.
2014/0255136 A1 9/2014 Malcolm et al.
2014/0265203 A1 9/2014 Zuleger et al.
2014/0271076 A1 9/2014 Perron
2014/0291945 A1 10/2014 Venton-Walters et al.
2014/0326555 A1 11/2014 Ellifson et al.
2014/0334956 A1 11/2014 Venton-Walters et al.
2015/0016931 A1 1/2015 Kuriakose et al.
2015/0028529 A1 1/2015 Ellifson
2015/0033962 A1 2/2015 Schwartz et al.
2015/0191069 A1 7/2015 Zuleger et al.
2015/0197129 A1 7/2015 Venton-Walters et al.
2015/0224847 A1 8/2015 Rowe et al.
2015/0259185 A1* 9/2015 Ditty .................... B66F 11/046 182/19
2015/0290993 A1 10/2015 Dillman et al.
2016/0009231 A1 1/2016 Perron et al.
2016/0160470 A1 6/2016 Kishimoto et al.
2016/0167475 A1 6/2016 Ellifson et al.
2016/0263981 A1 9/2016 Bunting
2016/0304051 A1 10/2016 Archer et al.
2016/0311253 A1 10/2016 Palmer et al.
2016/0368432 A1 12/2016 Perron et al.
2017/0137076 A1 5/2017 Perron et al.
2017/0291801 A1 10/2017 Mellott et al.
2018/0056746 A1 3/2018 Ellifson et al.
2022/0258967 A1 8/2022 Kappers et al.

FOREIGN PATENT DOCUMENTS

CN 118047334 A * 5/2024 ............. F15B 13/01
DE 11 86 334 1/1965
DE 36 20 603 A1 1/1987
DE 19901893 C1 6/2000
EP 0 517 546 A1 12/1992
EP 0 685 382 A1 12/1995
EP 1 134 415 A2 9/2001
EP 1 219 856 A1 7/2002
EP 1 327 792 A2 7/2003
EP 1 598 124 A1 11/2005
EP 1 371 391 B1 12/2009
FR 1471914 A 3/1967
FR 2380176 A1 9/1978
GB 2 168 015 6/1986
GB 2 224 982 5/1990
GB 2 389 828 12/2003
JP 4230421 B2 8/1992
JP H06-037090 5/1994
JP 2005-007995 A 1/2005
JP 2005-212698 A 8/2005
JP 2006-056463 A 3/2006
WO WO-85/02361 6/1985
WO WO-90/14528 A1 11/1990
WO WO-91/05180 4/1991
WO WO-01/76912 A1 10/2001
WO WO-03/049987 A2 6/2003
WO WO-2007/140179 A2 12/2007
WO WO-2009/048561 A1 4/2009
WO WO-2012/125482 A1 9/2012
WO WO-2014/040836 A1 3/2014
WO WO-2016/085646 6/2016
WO WO-2016/085649 A1 6/2016
WO WO-2016/085650 6/2016
WO WO-2016/085651 6/2016
WO WO-2016/085652 6/2016
WO WO-2016/085653 6/2016

OTHER PUBLICATIONS

U.S. Appl. No. 15/482,621, filed Apr. 7, 2017, Oshkosh Corporation.

U.S. Appl. No. 15/599,174, filed May 18, 2017, Oshkosh Defense, LLC.

U.S. Appl. No. 15/614,231, filed Jun. 5, 2017, Oshkosh Defense, LLC.

U.S. Appl. No. 15/631,800, filed Jun. 23, 2017, Oshkosh Defense, LLC.

U.S. Appl. No. 62/320,280, filed Apr. 8, 2016, Oshkosh Corporation.

Lambert et al. WO 2014/040836, ip.com English Machine Translation.

* cited by examiner

LEVELING SYSTEM FOR LIFT DEVICE

CROSS-REFERENCE TO RELATED PATENT APPLICATIONS

This application is a continuation of U.S. patent application Ser. No. 18/144,327, filed May 8, 2023, which is a continuation of U.S. patent application Ser. No. 17/464,897, filed Sep. 2, 2021, which is a continuation of U.S. patent application Ser. No. 16/525,080, filed Jul. 29, 2019, which is a continuation of U.S. patent application Ser. No. 15/880, 267, filed Jan. 25, 2018, which is a continuation of U.S. patent application Ser. No. 15/482,601, filed Apr. 7, 2017, which claims the benefit of U.S. Provisional Patent Application No. 62/320,280, filed Apr. 8, 2016, all of which are incorporated herein by reference in their entireties.

BACKGROUND

Traditional boom lifts may include a chassis, a turntable coupled to the chassis, and a boom assembly. The boom assembly may include one or more boom sections that are pivotally connected. A lift cylinder elevates one of the boom sections relative to the turntable and/or another one of the boom sections, thereby elevating an implement (e.g., work platform, forks, etc.) that is coupled to the boom assembly.

SUMMARY

One embodiment relates to a machine. The machine includes a base having a front end and a rear end, a first assembly pivotably coupled to the front end of the base and including a first tractive element, a second assembly pivotably coupled to the rear end of the base and including a second tractive element, a first actuator coupled to a frontmost wall of the front end of the base and the first assembly, and a second actuator coupled to a rearmost wall of the rear end of the base and the second assembly.

Another embodiment relates to a machine. The machine includes a base having a front end and a rear end, an assembly, and an actuator. The assembly is pivotably coupled to one of the front end or the rear end of the base. The assembly includes a tractive element. The assembly extends from the base such that the tractive element is at least partially spaced forward of or reward of, respectively, the one of the front end or the rear end of the base. The actuator is coupled to (a) one of a frontmost wall of the front end of the base or a rearmost wall of the rear end of the base and (b) the assembly.

Another embodiment relates to a boom lift. The boom lift includes a base having a front end and a rear end, a boom coupled to the base, an assembly pivotably coupled to one of the front end or the rear end of the base, and an actuator. The assembly includes a tractive element. The assembly extends from the base such that the tractive element is at least partially spaced forward of or reward of, respectively, the one of the front end or the rear end of the base. The actuator is coupled to (a) one of a frontmost wall of the front end of the base or a rearmost wall of the rear end of the base and (b) the assembly.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

According to an exemplary embodiment, a lift device includes a leveling system configured to maintain a chassis of the lift device level relative to gravity (e.g., flat, horizontal, etc.) while stationary and/or while moving (e.g., being driven, etc.). According to an exemplary embodiment, the leveling system operates as a semi-independent suspension system for the lift device. The leveling system may include a front leveling assembly pivotally coupled to a front end of the chassis and a rear leveling assembly pivotally coupled to a rear end of the chassis. The terms "front," "rear," "left," and "right" as used herein are relative terms to provide reference and not necessarily intended to be limiting. According to an exemplary embodiment, the leveling system improves the traction capabilities of the lift device by distributing loads between the tractive elements of the lift device while on uneven and/or sloped terrain. The leveling system may facilitate operating the lift device on larger slopes more effectively than traditional lift devices. According to an exemplary embodiment, the front leveling assembly and the rear leveling assembly are configured to facilitate providing two degrees of movement (e.g., pitch and roll, etc.). The lift device is configured to operate in various modes of operation (e.g., a boom operation mode, a transport mode, a driving mode, a calibration mode, etc.), according to an exemplary embodiment. At least one of the front leveling assembly and the rear leveling assembly may be actively controlled by a controller based on the mode of operation of the lift device. By way of example, the rear leveling assembly may be actively controlled by the controller and the front leveling assembly may by passively operated during a first mode of operation (e.g., a driving mode, etc.) of the lift device. By way of another example, the front leveling assembly and the rear leveling assembly may both be actively controlled by the controller during a second mode of operation (e.g., a boom operation mode, etc.) of the lift device. "Active control" refers to engaging valves, pumps, etc. with a processing circuit or controller to selectively vary the extension, retraction, etc. of an actuator (e.g., a hydraulic cylinder, etc.). "Passive control" refers to actuator extension, retraction, etc. that is permitted but not regulated using a processing circuit or controller.

Figure 1:
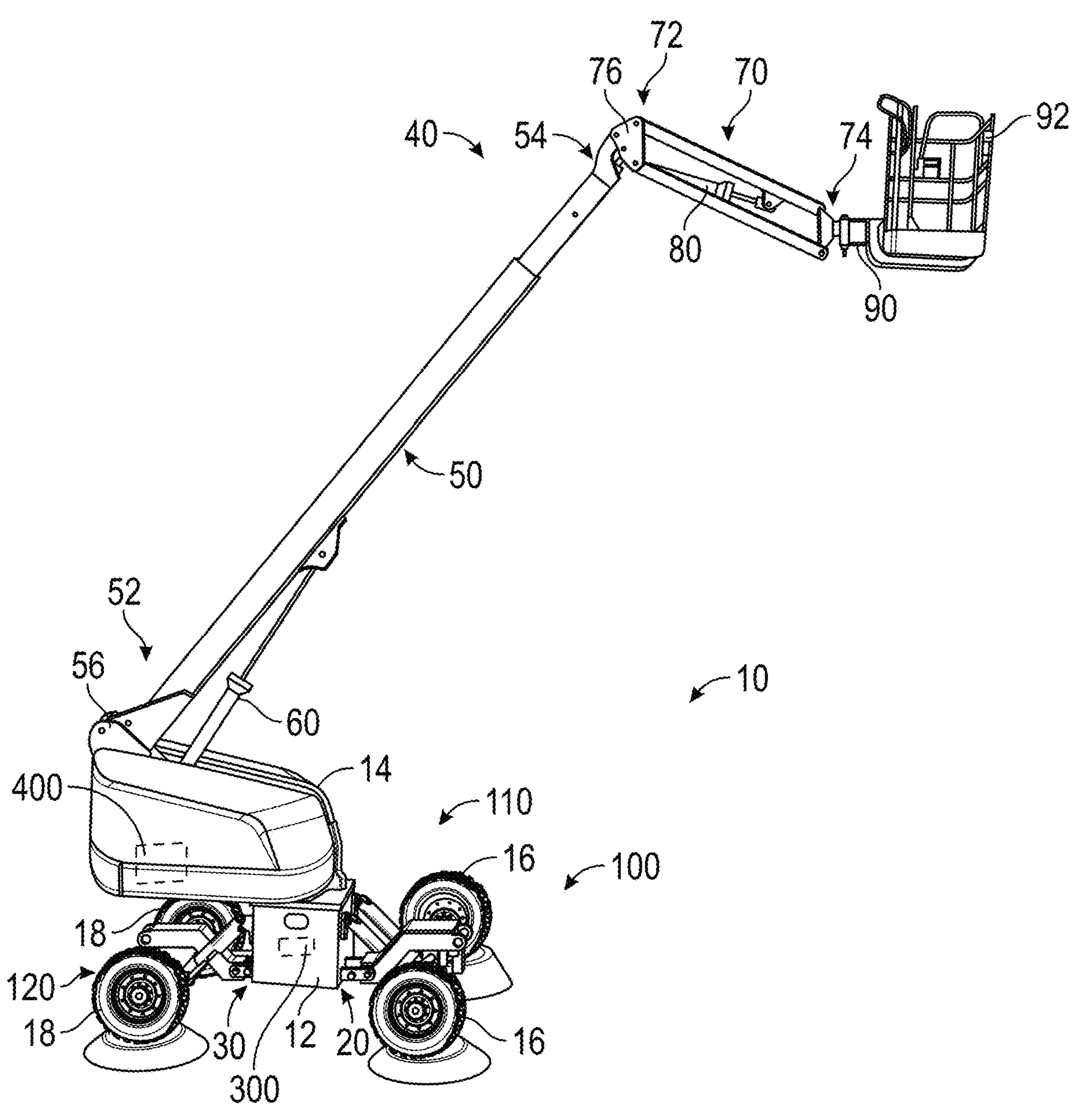
FIG. 1 is a perspective view of a lift device having a chassis, a leveling system, and a turntable, according to an exemplary embodiment.
Figure 2:
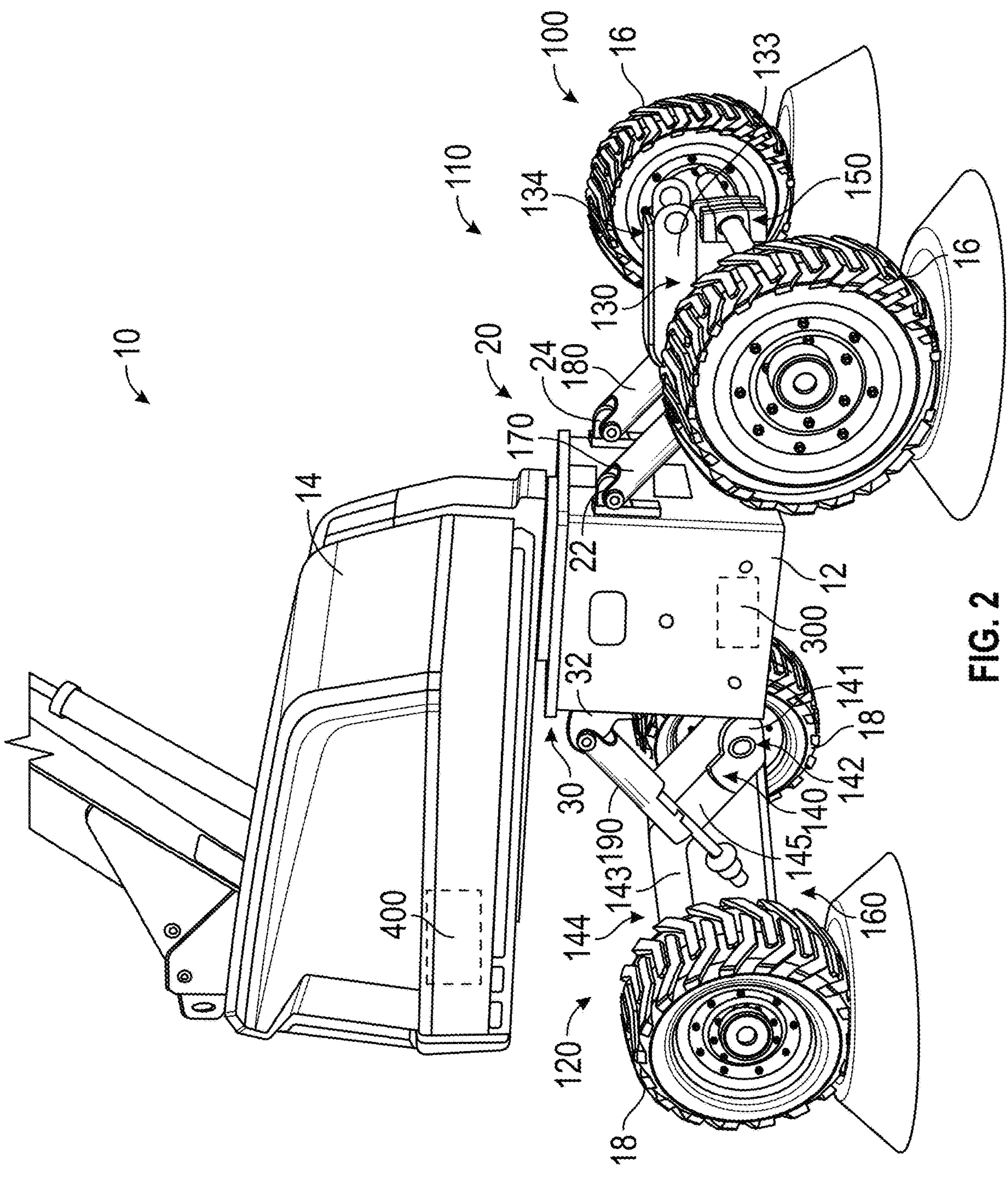
FIG. 2 is a detailed perspective view of the chassis and the turntable of the lift device of FIG. 1, according to an exemplary embodiment.

According to the exemplary embodiment shown in FIGS. 1-10, a lift device (e.g., an aerial work platform, a telehandler, a boom lift, a scissor lift, etc.), shown as lift device 10, includes a chassis, shown as lift base 12. In other embodiments, the lift device 10 is another type of vehicle (e.g., a fire apparatus, a military vehicle, an airport rescue fire fighting ("ARFF") truck, a boom truck, a refuse vehicle, a fork lift, etc.). As shown in FIGS. 1 and 2, the lift base 12 supports a rotatable structure, shown as turntable 14, and a boom assembly, shown as boom 40. According to an exemplary embodiment, the turntable 14 is rotatable relative to the lift base 12. According to an exemplary embodiment, the turntable 14 includes a counterweight positioned at a rear of the turntable 14. In other embodiments, the counterweight is otherwise positioned and/or at least a portion of the weight thereof is otherwise distributed throughout the lift device 10 (e.g., on the lift base 12, on a portion of the boom 40, etc.). As shown in FIGS. 1-10, a first end, shown as front end 20, of the lift base 12 is supported by a first plurality of tractive elements, shown as front tractive elements 16, and an opposing second end, shown as rear end 30, of the lift base 12 is supported by a second plurality of tractive elements, shown as rear tractive elements 18. According to the exemplary embodiment shown in FIGS. 1-10, the front tractive elements 16 and the rear tractive elements 18 include wheels. In other embodiments, the front tractive elements 16 and/or the rear tractive elements 18 include a track element.

As shown in FIG. 1, the boom 40 includes a first boom section, shown as lower boom 50, and a second boom section, shown as upper boom 70. In other embodiments, the boom 40 includes a different number and/or arrangement of boom sections (e.g., one, three, etc.). According to an exemplary embodiment, the boom 40 is an articulating boom assembly. In one embodiment, the upper boom 70 is shorter in length than lower boom 50. In other embodiments, the upper boom 70 is longer in length than the lower boom 50. According to another exemplary embodiment, the boom 40 is a telescopic, articulating boom assembly. By way of example, the upper boom 70 and/or the lower boom 50 may include a plurality of telescoping boom sections that are configured to extend and retract along a longitudinal centerline thereof to selectively increase and decrease a length of the boom 40.

As shown in FIG. 1, the lower boom 50 has a first end (e.g., lower end, etc.), shown as base end 52, and an opposing second end, shown as intermediate end 54. According to an exemplary embodiment, the base end 52 of the lower boom 50 is pivotally coupled (e.g., pinned, etc.) to the turntable 14 at a joint, shown as lower boom pivot 56. As shown in FIG. 1, the boom 40 includes a first actuator (e.g., pneumatic cylinder, electric actuator, hydraulic cylinder, etc.), shown as lower lift cylinder 60. The lower lift cylinder 60 has a first end coupled to the turntable 14 and an opposing second end coupled to the lower boom 50. According to an exemplary embodiment, the lower lift cylinder 60 is positioned to raise and lower the lower boom 50 relative to the turntable 14 about the lower boom pivot 56.

As shown in FIG. 1, the upper boom 70 has a first end, shown as intermediate end 72, and an opposing second end, shown as implement end 74. According to an exemplary embodiment, the intermediate end 72 of the upper boom 70 is pivotally coupled (e.g., pinned, etc.) to the intermediate end 54 of the lower boom 50 at a joint, shown as upper boom pivot 76. As shown in FIG. 1, the boom 40 includes an implement, shown as platform assembly 92, coupled to the implement end 74 of the upper boom 70 with an extension arm, shown as jib arm 90. In some embodiments, the jib arm 90 is configured to facilitate pivoting the platform assembly 92 about a lateral axis (e.g., pivot the platform assembly 92 up and down, etc.). In some embodiments, the jib arm 90 is configured to facilitate pivoting the platform assembly 92 about a vertical axis (e.g., pivot the platform assembly 92 left and right, etc.). In some embodiments, the jib arm 90 is configured to facilitate extending and retracting the platform assembly 92 relative to the implement end 74 of the upper boom 70. As shown in FIG. 1, the boom 40 includes a second actuator (e.g., pneumatic cylinder, electric actuator, hydraulic cylinder, etc.), shown as upper lift cylinder 80. According to an exemplary embodiment, the upper lift cylinder 80 is positioned to actuate (e.g., lift, rotate, elevate, etc.) the upper boom 70 and the platform assembly 92 relative to the lower boom 50 about the upper boom pivot 76.

According to an exemplary embodiment, the platform assembly 92 is a structure that is particularly configured to support one or more workers. In some embodiments, the platform assembly 92 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 92 includes a control panel to control operation of the lift device 10 (e.g., the turntable 14, the boom 40, etc.) from the platform assembly 92. In other embodiments, the platform assembly 92 includes or is replaced with an accessory and/or tool (e.g., forklift forks, etc.).

As shown in FIGS. 1-10, the lift device 10 includes a chassis leveling assembly, shown as leveling system 100. According to an exemplary embodiment, the leveling system 100 is configured to facilitate maintaining the lift base 12, the turntable 14, and/or the platform assembly 92 of the lift device 10 level relative to gravity (e.g., while stationary, while being driven on uneven and/or sloped ground, while operating the boom 40, etc.). As shown in FIGS. 1-10, the leveling system 100 includes a first leveling assembly, shown as front leveling assembly 110, pivotally coupled to the front end 20 of the lift base 12 and a second leveling assembly, shown as rear leveling assembly 120, pivotally coupled to the rear end 30 of the lift base 12. According to an exemplary embodiment, the front leveling assembly 110 and the rear leveling assembly 120 operate as a semi-independent suspension system for the lift device 10. Such a semi-independent suspension operation may facilitate providing two degrees of movement (e.g., pitch and roll, etc.) with each of the front leveling assembly 110 and the rear leveling assembly 120.

The lift device 10 may provide various features and/or performance characteristics that are advantageous for lift device operation. Such advantages may include: (i) providing a platform capacity of up to 600 pounds or more, (ii) providing a platform height of up to 46.5 feet or more, (iii) providing a horizontal reach of up to 39 feet or more, (iv) providing a platform rotation of up to 180 degrees or more, (v) providing a boom swing of up to 360 degrees, (vi) providing a drive speed of up to 4.5 miles per hour or more, (vii) providing a gradeability of up to 45 degrees or more, (viii) providing a turning radius of 16 feet or less, (ix) providing a variable ground clearance between less than 6 inches to more than 22 inches, and/or (x) providing up to +/−10 degrees or more of chassis pitch and roll, among still other advantages.

Figure 3:
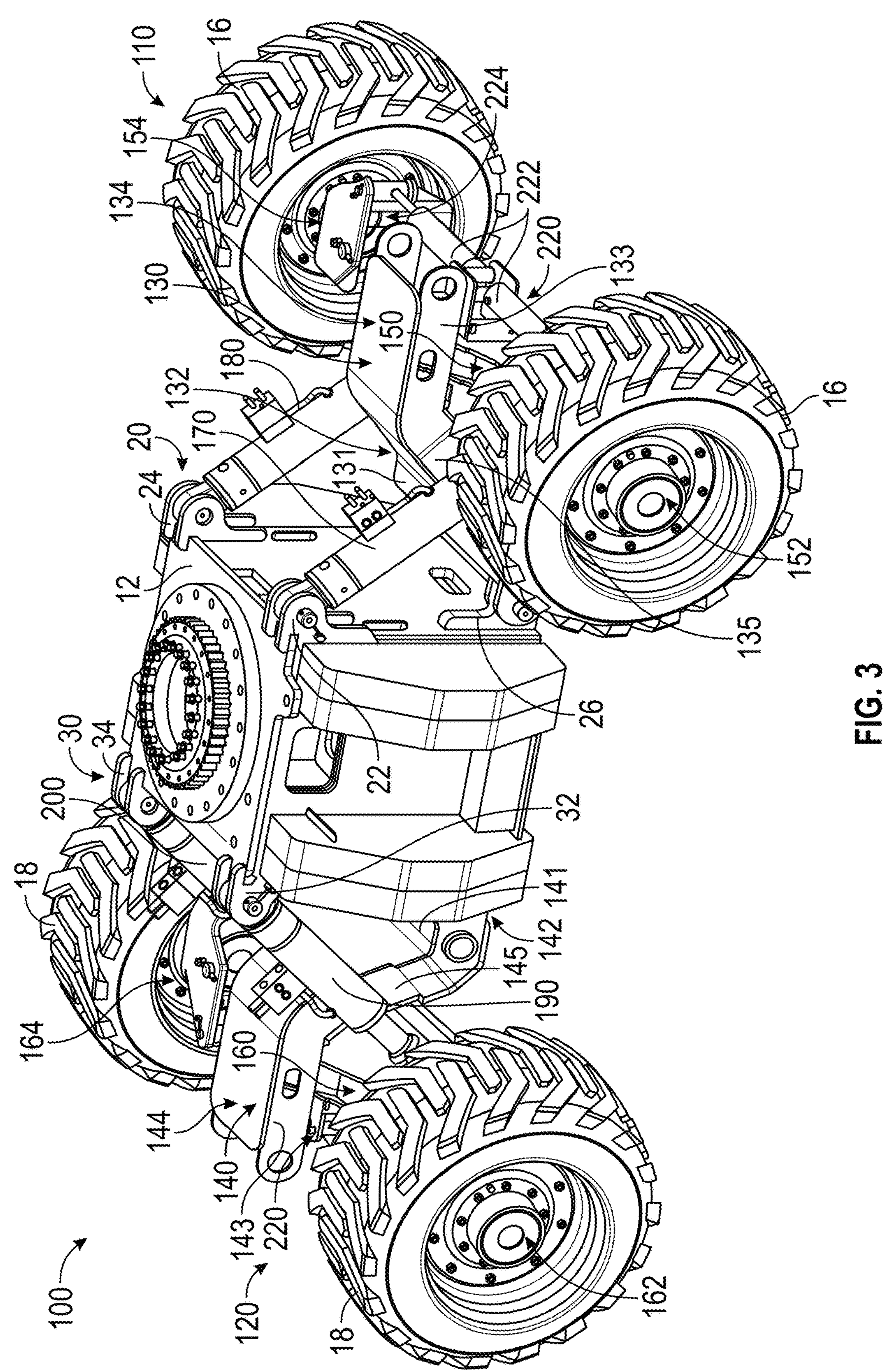
FIGS. 3 and 4 are detailed perspective views of the chassis and the leveling system of the lift device of FIG. 1, according to an exemplary embodiment.
Figure 4:
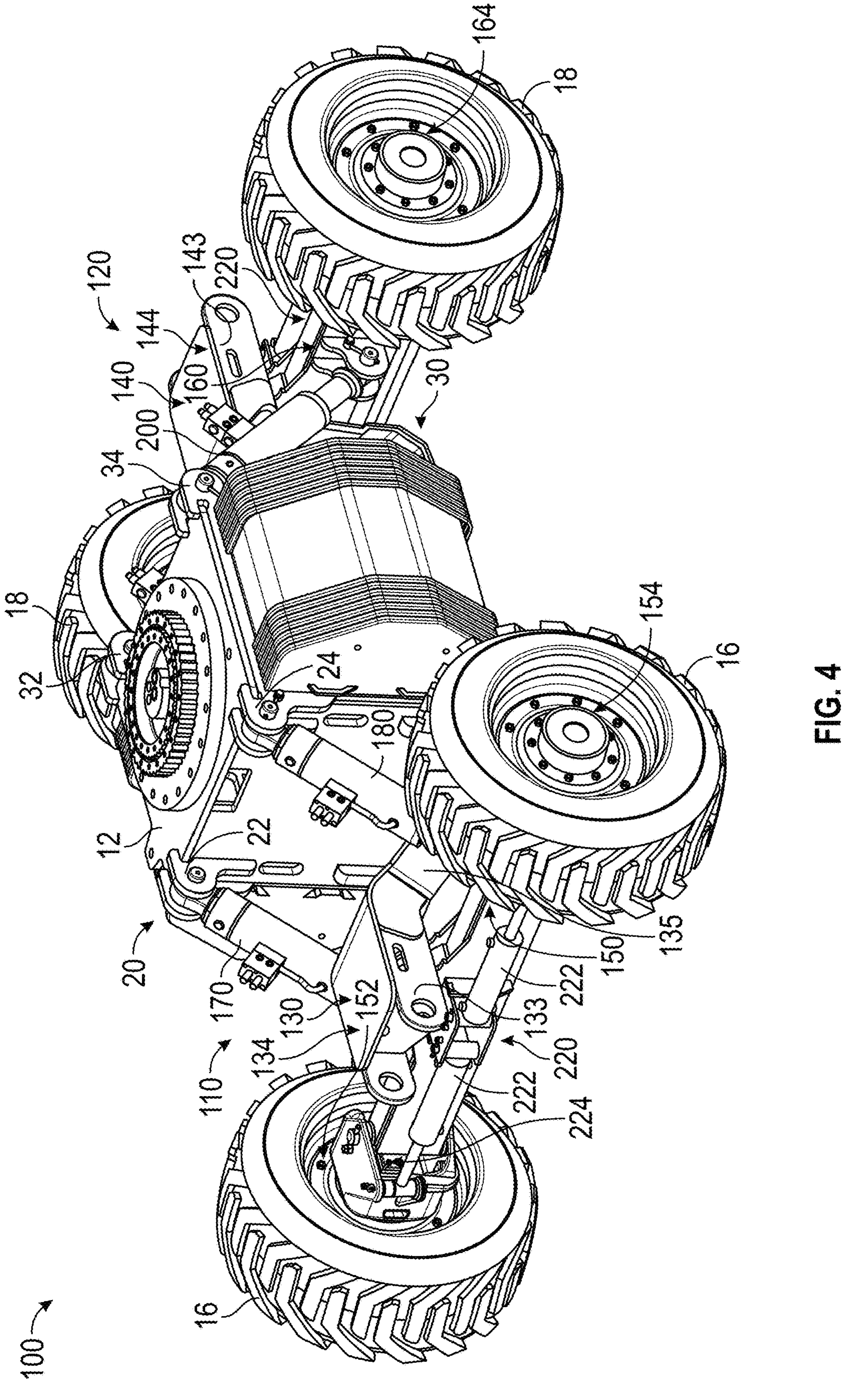
Figure 5:
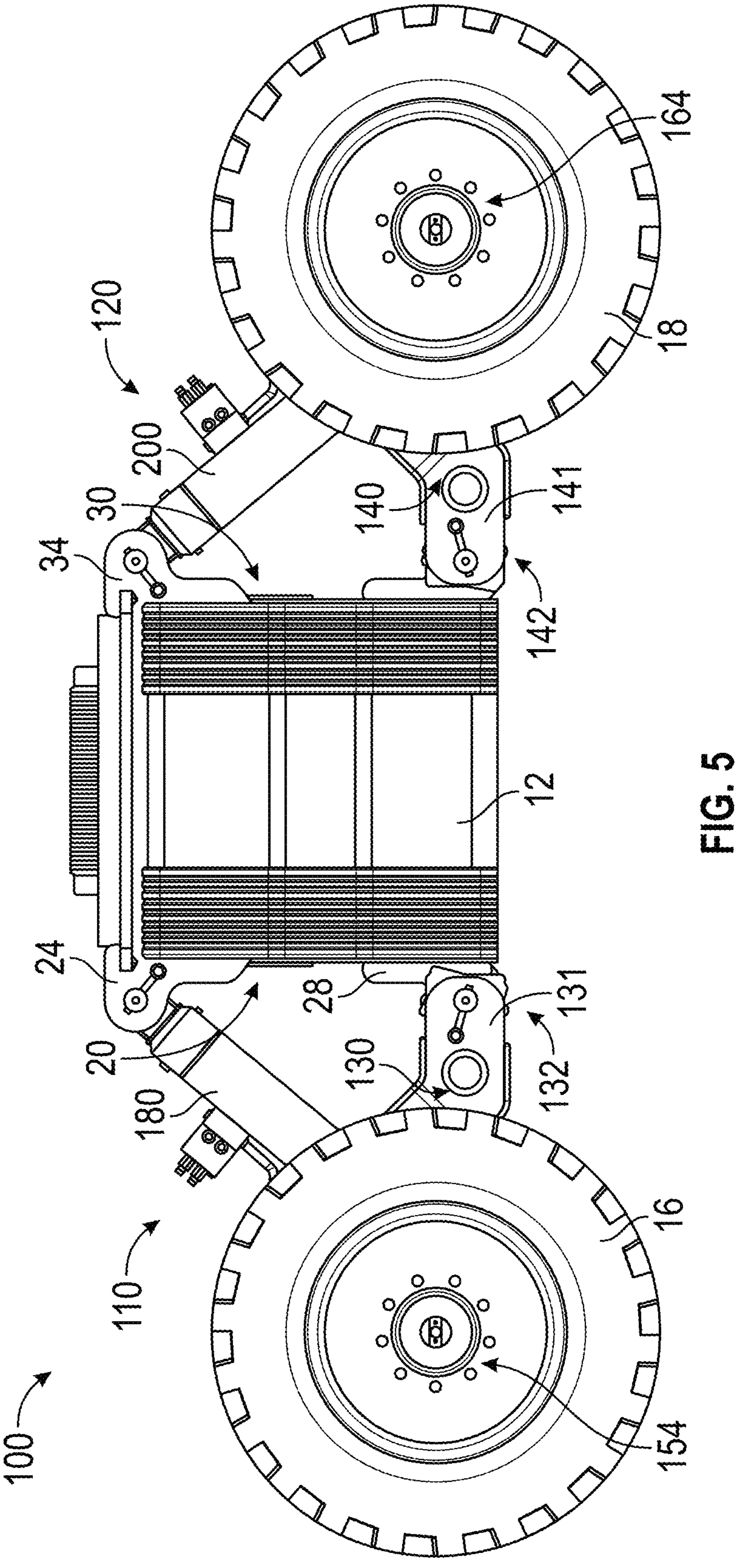
FIG. 5 is a side view of the chassis and the leveling system of the lift device of FIG. 1, according to an exemplary embodiment.
Figure 6:
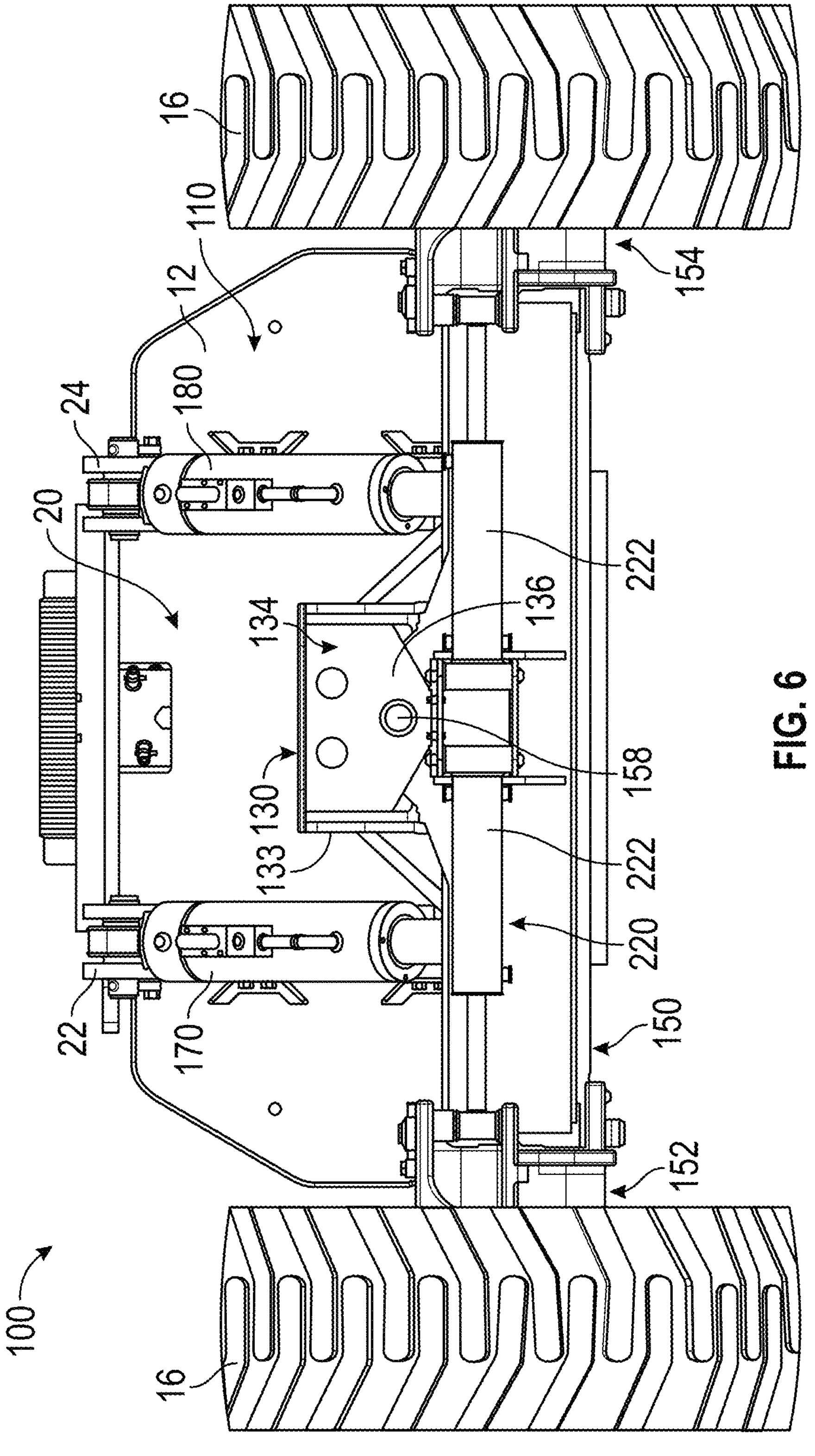
FIG. 6 is a front view of the chassis and the leveling system of the lift device of FIG. 1, according to an exemplary embodiment.
Figure 7:
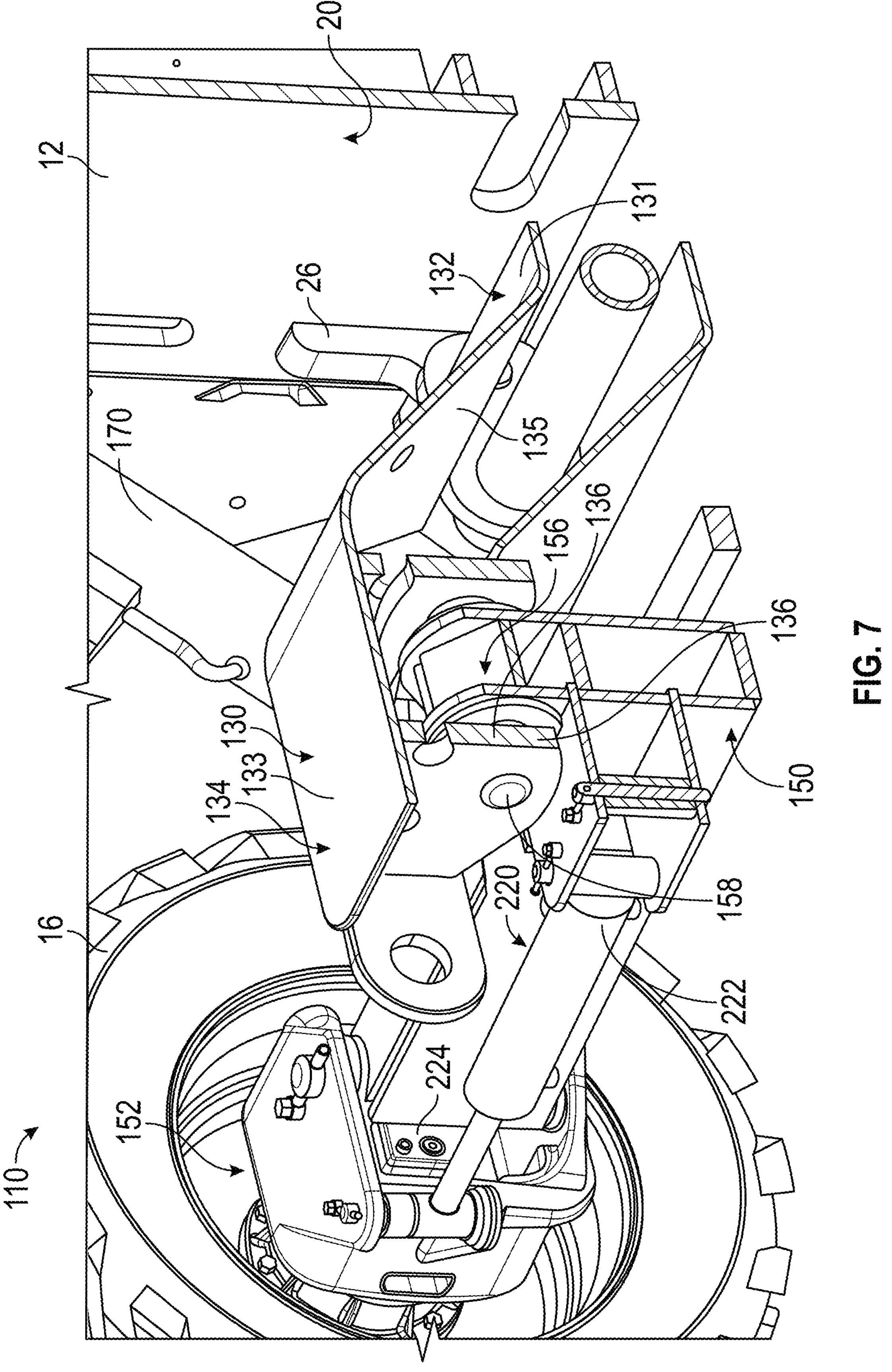
FIG. 7 is a perspective cross-sectional view of the leveling system and a steering system of the lift device of FIG. 1, according to an exemplary embodiment.
Figure 8:
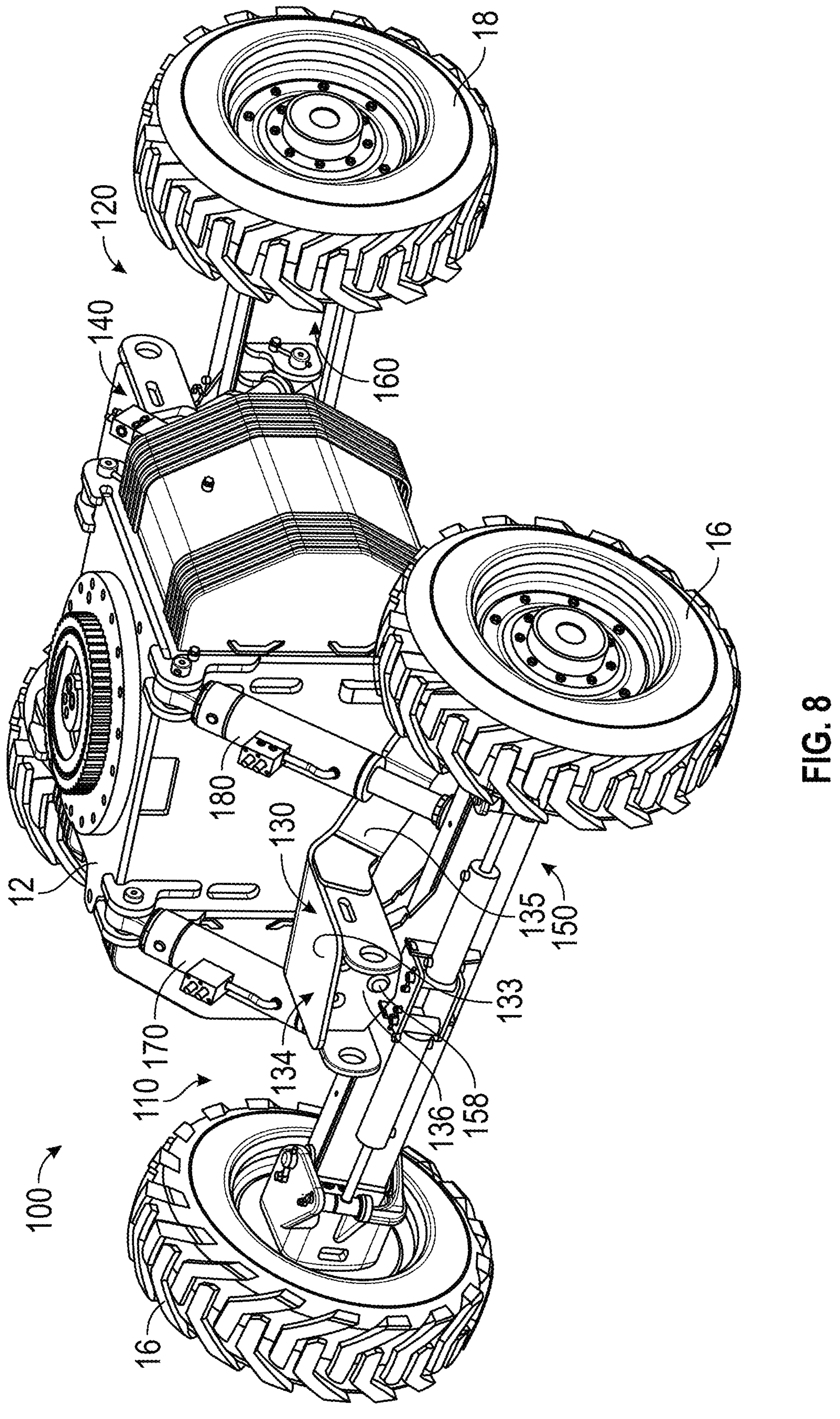
FIGS. 8-10 are various views of the chassis and the leveling system of the lift device of FIG. 1 in a pivoted orientation, according to an exemplary embodiment.
Figure 9:
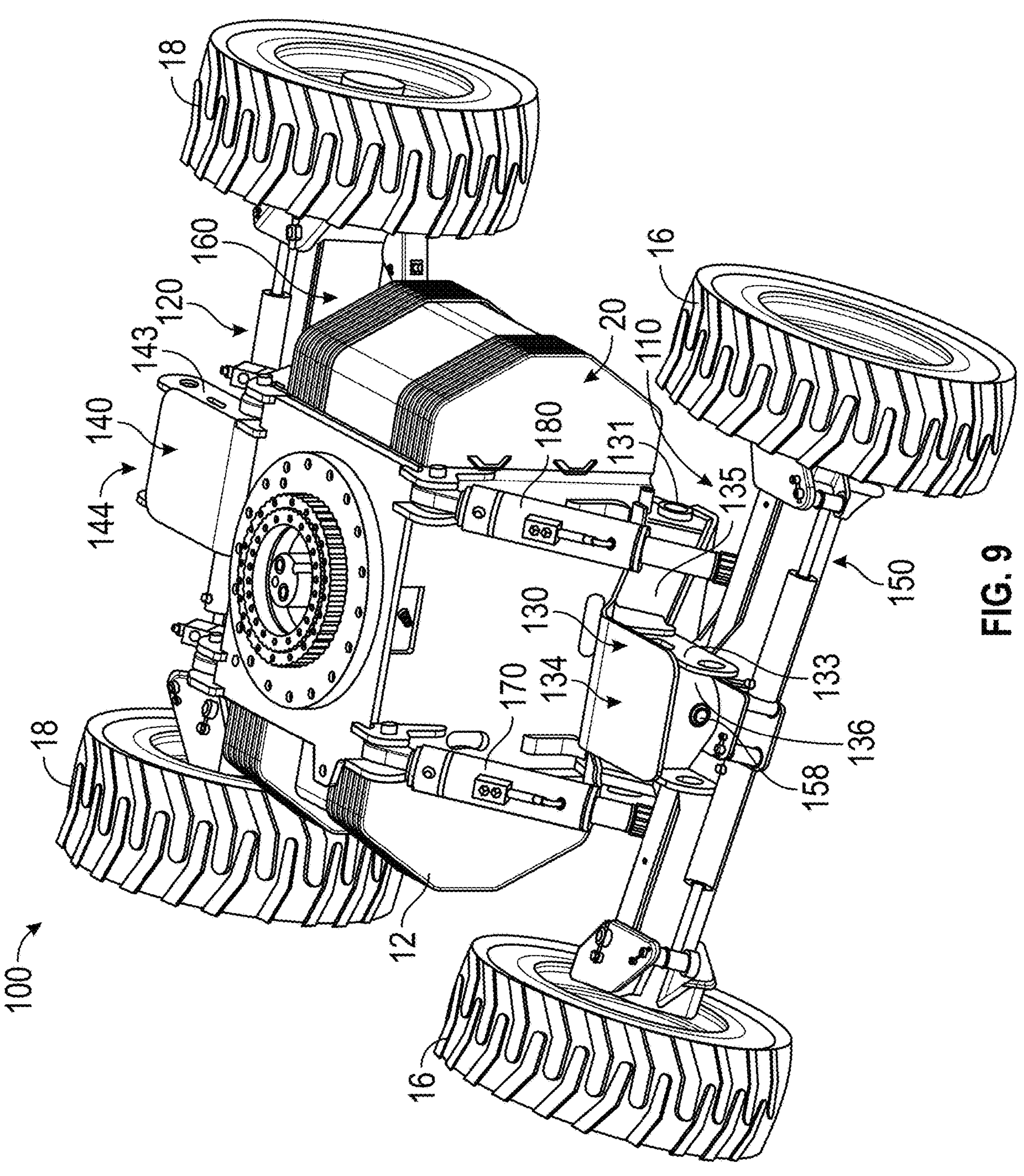
Figure 10:
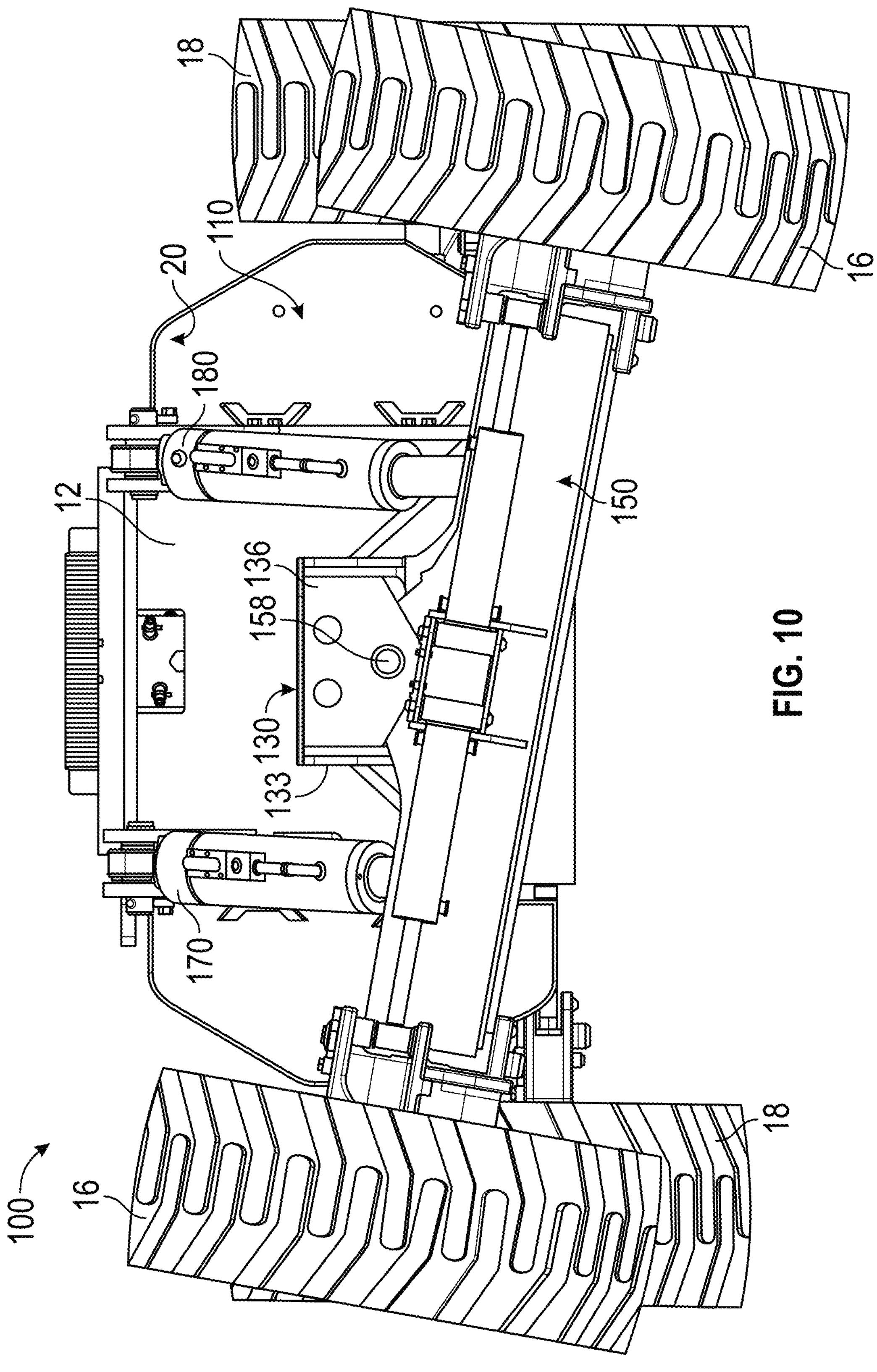

As shown in FIGS. 2-10, the front leveling assembly 110 includes a first carrier arm, shown as front trailing arm 130; a first axle, shown as front axle 150; a first front actuator, shown as front right actuator 170; and a second front actuator, shown as front left actuator 180. According to an exemplary embodiment, the front right actuator 170 and the front left actuator 180 each include a hydraulic cylinder. In other embodiments, the front right actuator 170 and/or the front left actuator 180 include another type of actuator (e.g., a pneumatic cylinder, an electric actuator, etc.). As shown in FIGS. 3, 5, 7, and 9, the front trailing arm 130 has a first portion, shown as base 131, positioned at a first end, shown as chassis end 132, of the front trailing arm 130. As shown in FIGS. 2-4 and 6-10, the front trailing arm 130 has a second portion, shown as projection 133, positioned at an opposing second end, shown as axle end 134, of the front trailing arm 130. As shown in FIGS. 3, 4, and 7-9, the front trailing arm 130 has a third portion, shown as transition 135, extending between the base 131 and the projection 133. As shown in FIGS. 3, 5, and 7, the base 131 defines a pivot interface at the chassis end 132 of the front trailing arm 130 that pivotally couples to the front end 20 of the lift base 12 at a pair of pivot points positioned at a bottom end of the front end 20 of the lift base 12, shown as lower right pivot 26 and lower left pivot 28. Such a pivotal coupling between the front end 20 of the lift base 12 and the front trailing arm 130 may facilitate a pitch adjustment operation of the front leveling assembly 110 (e.g., pivoting of the front trailing arm 130 about a lateral axis extending through the lower right pivot 26 and the lower left pivot 28, etc.).

According to the exemplary embodiment shown in FIGS. 3, 4, and 7-9, the transition 135 extends from the base 131 to the projection 133 at an angle such that the projection 133 is elevated relative to the base 131. The front trailing arm 130 may thereby have a ramped or sloped profile (e.g., an elongated S-shape, an elongated Z-shape, etc.). In some embodiments, the base 131 and the projection 133 are parallel with each other (e.g., planes defined by the base 131 and the projection 133 may be parallel, etc.). As shown in FIG. 7, the front trailing arm 130 has a dual-plate construction such that the front trailing arm 130 includes a first, upper plate and a second, lower plate spaced from the first, upper plate (e.g., a space or gap is formed therebetween, etc.). In other embodiments, the front trailing arm 130 has a single plate construction and/or has a solid structure.

As shown in FIGS. 3-7, the front axle 150 has a first end, shown as right end 152, and an opposing second end, shown as left end 154. A first front tractive element 16 is coupled to the right end 152 of the front axle 150, and a second front tractive element 16 is coupled to the left end 154 of the front axle 150. As shown in FIG. 7, the front axle 150 includes a coupler, shown as front axle pivot interface 156, positioned to engage a corresponding coupler, shown as front trailing arm pivot interface 136, defined by the projection 133 and positioned at the axle end 134 of the front trailing arm 130. As shown in FIG. 7, the front axle pivot interface 156 and the front trailing arm pivot interface 136 are configured to interengage and cooperatively receive a fastener, shown as pin 158. According to an exemplary embodiment, the pin 158 pivotally couples the front axle 150 to the axle end 134 of the front trailing arm 130. The pivotal joint between the front trailing arm 130 and the front axle 150 may facilitate a roll adjustment operation of the front leveling assembly 110 about the pin 158 (e.g., pivoting of the front axle 150 about a central longitudinal axis of the lift device 10, etc.).

As shown in FIGS. 2-4 and 6, a first end (e.g., an upper end, etc.) of the front right actuator 170 is pivotally coupled to the front end 20 of the lift base 12 at a pivot point, shown as upper right pivot 22. According to an exemplary embodiment, an opposing second end (e.g., a lower end, etc.) of the front right actuator 170 is pivotally coupled to a corresponding pivot point positioned along the front axle 150 (e.g., proximate the right end 152 thereof, etc.). As shown in FIGS. 2-6, a first end (e.g., an upper end, etc.) of the front left actuator 180 is pivotally coupled to the front end 20 of the lift base 12 at a pivot point, shown as upper left pivot 24. According to an exemplary embodiment, an opposing second end (e.g., a lower end, etc.) of the front left actuator 180 is pivotally coupled to a corresponding pivot point positioned along the front axle 150 (e.g., proximate the left end 154 thereof, etc.). Such a pivotal coupling of (i) the front right actuator 170 between the front end 20 of the lift base 12 and the front axle 150 and (ii) the front left actuator 180 between the front end 20 of the lift base 12 and the front axle 150 may facilitate actively and/or passively providing the pitch and/or roll adjustment operations of the front leveling assembly 110 (e.g., pivoting of the front trailing arm 130 about a lateral axis extending through the lower right pivot 26 and the lower left pivot 28, pivoting of the front axle 150 about a central longitudinal axis of the lift device 10, etc.).

As shown in FIGS. 2-5, 8, and 9, the rear leveling assembly 120 includes a second carrier arm, shown as rear trailing arm 140; a second axle, shown as rear axle 160; a first rear actuator, shown as rear right actuator 190; and a second rear actuator, shown as rear left actuator 200. According to an exemplary embodiment, the rear right actuator 190 and the rear left actuator 200 each include a hydraulic cylinder. In other embodiments, the rear right actuator 190 and/or the rear left actuator 200 include another type of actuator (e.g., a pneumatic cylinder, an electric actuator, etc.). As shown in FIGS. 2, 3, and 5, the rear trailing arm 140 has a first portion, shown as base 141, positioned at a first end, shown as chassis end 142, of the rear trailing arm 140. As shown in FIGS. 2-4, 8, and 9, the rear trailing arm 140 has a second portion, shown as projection 143, positioned at an opposing second end, shown as axle end 144, of the rear trailing arm 140. As shown in FIGS. 2 and 3, the rear trailing arm 140 has a third portion, shown as transition 145, extending between the base 141 and the projection 143. According to an exemplary embodiment, the base 141 defines a pivot interface at the chassis end 142 of the rear trailing arm 140 that pivotally couples to the rear end 30 of the lift base 12 at a pair of lower pivot points positioned at a bottom end of the rear end 30 of the lift base 12 (e.g., similar to the base 131 of the front trailing arm 130 at the lower right pivot 26 and the lower left pivot 28, etc.).

Such a pivotal coupling between the rear end 30 of the lift base 12 and the rear trailing arm 140 may facilitate a pitch adjustment operation of the rear leveling assembly 120 (e.g., pivoting of the rear trailing arm 140 about a lateral axis extending through the pair of lower pivot points of the rear end 30 of the lift base 12, etc.).

According to the exemplary embodiment shown in FIGS. 2 and 3, the transition 145 extends from the base 141 to the projection 143 at an angle such that the projection 143 is elevated relative to the base 141. The rear trailing arm 140 may thereby have a ramped or sloped profile (e.g., an elongated S-shape, an elongated Z-shape, etc.). In some embodiments, the base 141 and the projection 143 are parallel with each other (e.g., planes defined by the base 141 and the projection 143 may be parallel, etc.). According to an exemplary embodiment, the rear trailing arm 140 has a dual-plate construction such that the rear trailing arm 140 includes a first, upper plate and a second, lower plate spaced from the first, upper plate (e.g., a space or gap is formed therebetween, etc.). In other embodiments, the rear trailing arm 140 has a single plate construction and/or has a solid structure.

As shown in FIGS. 3-5, the rear axle 160 has a first end, shown as right end 162, and an opposing second end, shown as left end 164. A first rear tractive element 18 is coupled to the right end 162 of the rear axle 160 and a second rear tractive element 18 is coupled to the left end 164 of the rear axle 160. According to an exemplary embodiment, the rear axle 160 includes a rear axle pivot interface (e.g., similar to the front axle pivot interface 156 of the front axle 150, etc.) positioned to engage a corresponding rear trailing arm pivot interface defined by the projection 143 and positioned at the axle end 144 of the rear trailing arm 140 (e.g., similar to the front trailing arm pivot interface 136 of the front trailing arm 130, etc.). The rear axle pivot interface and the rear trailing arm pivot interface are configured to interengage and cooperatively receive a fastener (e.g., similar to the pin 158, etc.) to pivotally couple the rear axle 160 to the rear trailing arm 140, according to an exemplary embodiment. The pivotal joint between the rear trailing arm 140 and the rear axle 160 may facilitate a roll adjustment operation of the rear leveling assembly 120 (e.g., pivoting of the rear axle 160 about a central longitudinal axis of the lift device 10, etc.).

As shown in FIGS. 2 and 3, a first end (e.g., an upper end, etc.) of the rear right actuator 190 is pivotally coupled to the rear end 30 of the lift base 12 at a pivot point, shown as upper right pivot 32. According to an exemplary embodiment, an opposing second end (e.g., a lower end, etc.) of the rear right actuator 190 is pivotally coupled to a corresponding pivot point positioned along the rear axle 160 (e.g., proximate the right end 162 thereof, etc.). As shown in FIGS. 3-5, a first end (e.g., an upper end, etc.) of the rear left actuator 200 is pivotally coupled to the rear end 30 of the lift base 12 at a pivot point, shown as upper left pivot 34. According to an exemplary embodiment, an opposing second end (e.g., a lower end, etc.) of the rear left actuator 200 is pivotally coupled to a corresponding pivot point positioned along the rear axle 160 (e.g., proximate the left end 164 thereof, etc.). Such a pivotal coupling of (i) the rear right actuator 190 between the rear end 30 of the lift base 12 and the rear axle 160 and (ii) the rear left actuator 200 between the rear end 30 of the lift base 12 and the rear axle 160 may facilitate actively and/or passively providing the pitch and/or roll adjustment operations of the rear leveling assembly 120 (e.g., pivoting of the rear trailing arm 140 about a lateral axis extending through the pair of lower pivot points of the rear end 30 of the lift base 12, pivoting of the rear axle 160 about a central longitudinal axis of the lift device 10, etc.).

As shown in FIGS. 3, 4, 6, and 7, the front axle 150 and the rear axle 160 include a drive system, shown as drive system 220. The drive system 220 includes actuators (e.g., pneumatic cylinders, electric actuators, hydraulic cylinders, etc.), shown as steering actuators 222, and drivers (e.g., electric actuators, motors, etc.), shown as drive actuators 224. As shown in FIGS. 3, 4, and 6, the front axle 150 includes a pair of steering actuators 222. Each steering actuator 222 may be positioned to facilitate steering one of the front tractive elements 16 (e.g., independent steering of each of the front tractive elements 16, etc.). According to an exemplary embodiment, the rear axle 160 includes a pair of steering actuators 222. Each steering actuator 222 may be positioned to facilitate steering one of the rear tractive elements 18 (e.g., independent steering of each of the rear tractive elements 18, etc.). In other embodiments, the front axle 150 and/or the rear axle 160 include a single steering actuator 222 positioned to facilitate steering both of the front tractive elements 16 and/or both of the rear tractive elements 18, respectively. As shown in FIGS. 3, 4, and 7, the front axle 150 includes a pair of drive actuators 224. Each drive actuator 224 may be positioned to facilitate driving one of the front tractive elements 16. According to an exemplary embodiment, the rear axle 160 includes a pair of drive actuators 224. Each drive actuator 224 may be positioned to facilitate driving one of the rear tractive elements 18.

As shown in FIGS. 1 and 2, the lift device 10 includes an actuator circuit, shown as actuator circuit 300, and a control system, shown as lift device control system 400. According to an exemplary embodiment, the actuator circuit 300 includes a hydraulic circuit configured to facilitate operating (e.g., driving the extension and/or retraction of, etc.) the front right actuator 170, the front left actuator 180, the rear right actuator 190, the rear left actuator 200, the steering actuators 222, and/or the drive actuators 224 (e.g., in embodiments where the actuators include hydraulic cylinders, etc.). In other embodiments, the actuator circuit 300 includes an electric circuit (e.g., in embodiments where the actuators include electric actuators, etc.) and/or a pneumatic circuit (e.g., in embodiment where the actuators include pneumatic cylinders, etc.). According to an exemplary embodiment, the lift device control system 400 is configured to control the operation of the actuator circuit 300 and thereby the front right actuator 170, the front left actuator 180, the rear right actuator 190, the rear left actuator 200, the steering actuators 222, and/or the drive actuators 224 (e.g., the extension and/or retraction thereof, the relative motion between the front axle 150 and/or the rear axle 160 and the lift base 12, the pitch and/or roll adjustment operations of the front axle 150 and/or the rear axle 160, etc.).

Figure 11:
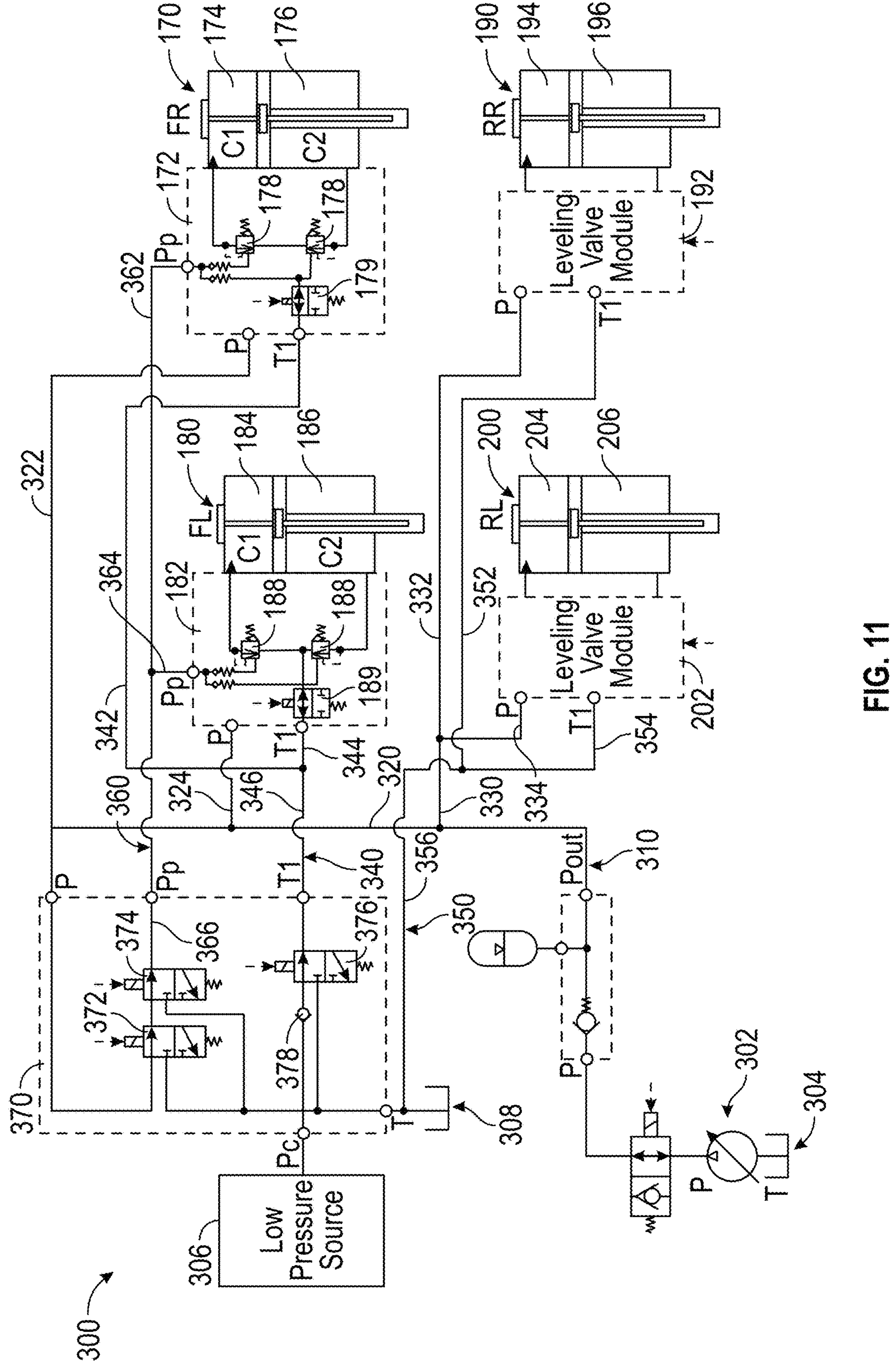
FIG. 11 is a schematic diagram of an actuator circuit for the leveling system of the lift device of FIG. 1, according to an exemplary embodiment.

According to the exemplary embodiment shown in FIG. 11, the actuator circuit 300 includes a pump, shown as pump 302, a fluid reservoir, shown as tank 304, and a low pressure source, shown as low pressure source 306. The tank 304 is configured to supply the pump 302 with a fluid (e.g., hydraulic fluid, compressed air, etc.), which the pump 302 provides at a high pressure throughout the actuator circuit 300. As shown in FIG. 11, the actuator circuit 300 includes a high pressure line, shown as high pressure line 310, that includes a first high pressure line, shown as front high pressure line 320, and a second high pressure line, shown as rear high pressure line 330. The front high pressure line 320 includes a first front high pressure line, shown as front right high pressure line 322, and a second front high pressure line, shown as front left high pressure line 324. As shown in FIG.

11, the front right high pressure line 322 fluidly couples the pump 302 to a first front leveling module, shown as front right leveling module 172, associated with the front right actuator 170 and configured to facilitate an extension and retraction operation of the front right actuator 170. The front left high pressure line 324 fluidly couples the pump 302 to a second front leveling module, shown as front left leveling module 182, associated with the front left actuator 180 and configured to facilitate an extension and retraction operation of the front left actuator 180.

As shown in FIG. 11, the rear high pressure line 330 includes a first rear high pressure line, shown as rear right high pressure line 332, and a second rear high pressure line, shown as rear left high pressure line 334. The rear right high pressure line 332 fluidly couples the pump 302 to a first rear leveling module, shown as rear right leveling module 192, associated with the rear right actuator 190 and configured to facilitate an extension and retraction operation of the rear right actuator 190. The rear left high pressure line 334 fluidly couples the pump 302 to a second rear leveling module, shown as rear left leveling module 202, associated with the rear left actuator 200 and configured to facilitate an extension and retraction operation of the rear left actuator 200. According to an exemplary embodiment, the high pressure line 310 is positioned to facilitate providing high pressure fluid to a first chamber, shown as first chamber 174, first chamber 184, first chamber 194, and first chamber 204, of the front right actuator 170, the front left actuator 180, the rear right actuator 190, and the rear left actuator 200, respectively, to facilitate an extension operation thereof.

As shown in FIG. 11, the actuator circuit 300 includes a low pressure line including a first low pressure line, shown as front low pressure line 340, and a second low pressure line, shown as rear low pressure line 350. The front low pressure line 340 includes a first front low pressure line, shown as front right low pressure line 342, and a second front low pressure line, shown as front left low pressure line 344. As shown in FIG. 11, the front right low pressure line 342 and the front left low pressure line 344 are fluidly coupled to a third low pressure line, shown as third low pressure line 346. The third low pressure line 346 fluidly couples the front right leveling module 172 and the front left leveling module 182 to a valve block, shown as valve block 370. The valve block 370 includes a valve, shown as valve 376, positioned to selectively fluidly couple the front low pressure line 340 to the low pressure source 306 and/or a reservoir, shown as tank 308 (e.g., based on a mode of operation of the lift device 10, etc.).

As shown in FIG. 11, the rear low pressure line 350 includes a first rear low pressure line, shown as rear right low pressure line 352, and a second rear low pressure line, shown as rear left low pressure line 354. As shown in FIG. 11, the rear right low pressure line 352 and the rear left low pressure line 354 are fluidly coupled to a third low pressure line, shown as third low pressure line 356. The third low pressure line 356 fluidly couples the rear right leveling module 192 and the rear left leveling module 202 to the tank 308. According to an exemplary embodiment, the front low pressure line 340 is positioned to facilitate providing low pressure fluid to a second chamber, shown as second chamber 176 and second chamber 186, of the front right actuator 170 and the front left actuator 180, respectively, to facilitate a retraction operation thereof. According to an exemplary embodiment, rear low pressure line 350 is positioned to facilitate providing low pressure fluid to a second chamber, show as second chamber 196 and second chamber 206, of the rear right actuator 190 and the rear left actuator 200, respectively, to facilitate a retraction operation thereof.

As shown in FIG. 11, the actuator circuit 300 includes an auxiliary line, shown as auxiliary line 360. The auxiliary line 360 includes a first auxiliary line, shown as front right auxiliary line 362, and a second auxiliary line, shown as front left auxiliary line 364. The front right auxiliary line 362 and the front left auxiliary line 364 are fluidly coupled to a third auxiliary line, shown as third auxiliary line 366. The third auxiliary line 366 fluidly couples the front right leveling module 172 and the front left leveling module 182 to the valve block 370. According to an exemplary embodiment, the front low pressure line 340, the auxiliary line 360, and/or the valve block 370 are cooperatively engaged to operate the front right actuator 170 and the front left actuator 180 according to a passive mode of operation (e.g., based on the mode of operation of the lift device 10, a front leveling assembly free oscillation mode, etc.). By way of example, the passive mode of operation may be facilitated by activating (e.g., energizing, switching, opening, closing, etc.) valves (e.g., proportional valves, load holding valves, electro-magnetic valves, etc.) of the valve block 370, shown as valve 372 and valve 374. Such activation may include opening or closing one or more valves of the front right leveling module 172, shown as actuator valves 178, and the front left leveling module 182, shown as actuator valves 188. Such an operation may additionally or alternatively include activating (e.g., energizing, switching, opening, closing, etc.) a valve of the valve block 370, shown as valve 376, a valve of the front right leveling module 172, shown as actuator valve 179, and/or a valve of the front left leveling module 182, shown as actuator valve 189. Such activation may thereby fluidly couple the first chamber 174 and/or the second chamber 176 of the front right actuator 170 to the first chamber 184 and/or the second chamber 186 of the front left actuator 180 to facilitate a fluid flow (e.g., a free fluid flow, etc.) therebetween (e.g., between the first chamber 174 and the second chamber 186, between the second chamber 176 and the first chamber 184, etc.), as well as isolate the front right actuator 170 and the front left actuator 180 from the pump 302 (e.g., the front right actuator 170 and the front left actuator 180 do not receive high pressure fluid from the pump 302 such that they are not actively controlled, but passively controlled, etc.). According to an exemplary embodiment, the pressure from the low pressure source 306 is configured to ensure that the front low pressure line 340 remains pressurized (e.g., account for losses, etc.) through a valve, shown as check valve 378.

Figure 12:
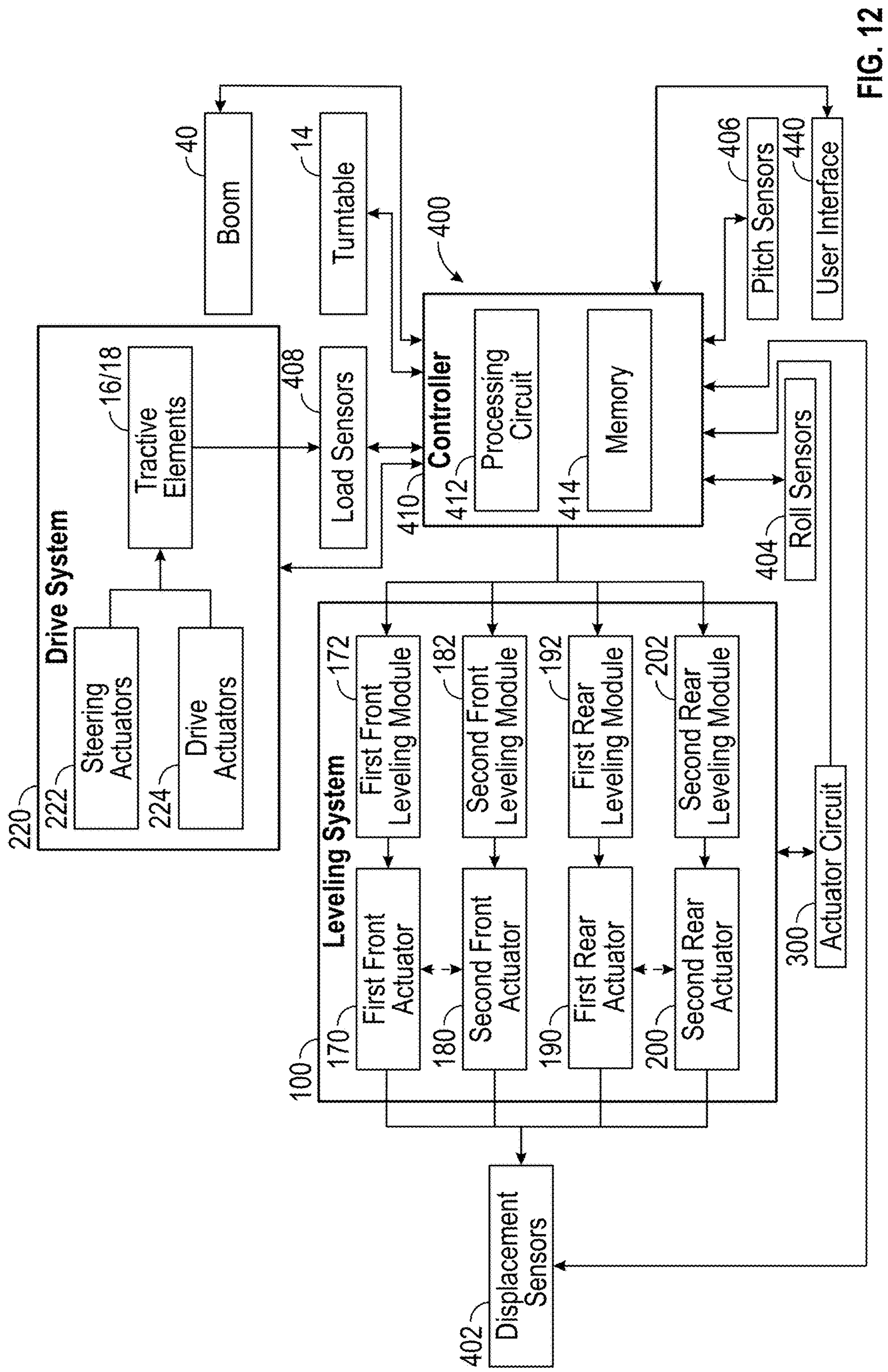
FIG. 12 is a schematic block diagram of a control system of the lift device of FIG. 1, according to an exemplary embodiment.

According to the exemplary embodiment shown in FIG. 12, the lift device control system 400 for the lift device 10 includes a controller 410. In one embodiment, the controller 410 is configured to selectively engage, selectively disengage, control, and/or otherwise communicate with components of the lift device 10 (e.g., actively control the components thereof, etc.). In some embodiments, the controller 410 is configured to facilitate passively controlling at least some of the components to the lift device 10 (e.g., based on the mode of operation of the lift device 10, the front leveling assembly 110, etc.). As shown in FIG. 12, the controller 410 is coupled to the turntable 14, the boom 40, the leveling system 100 (e.g., the leveling modules thereof, etc.), the drive system 220 (e.g., the steering actuators 222, the drive actuators 224, etc.), the actuator circuit 300, various sensors including displacement sensors 402, roll sensors 404, pitch sensors 406, and load sensors 408, and a user interface 440. In other embodiments, the controller 410 is coupled to more or fewer components. The controller 410 may be configured to actively control the pitch adjustment and/or the roll adjustment of at least the one of (i) the front leveling assembly 110 (e.g., through the extension and/or retraction of the front right actuator 170 and/or the front left actuator 180, etc.) and (ii) the rear leveling assembly 120 (e.g., through the extension and/or retraction of the rear right actuator 190 and/or the rear left actuator 200, etc.) to at least improve the orientation of the lift base 12, the turntable 14, and/or the boom 40 relative to gravity (e.g., while driving the lift device 10, while operating the boom 40, in a longitudinal direction, in lateral direction, etc.). By way of example, the controller 410 may maintain the lift base 12, the turntable 14 and/or the boom 40 level relative to gravity. Such control of the front leveling assembly 110 and/or the rear leveling assembly 120 may be based on a mode of operation of the lift device 10. By way of example, the controller 410 may send and receive signals with the turntable 14, the boom 40, the leveling system 100, the drive system 220, the actuator circuit 300, the displacement sensors 402, the roll sensors 404, the pitch sensors 406, the load sensors 408, and/or the user interface 440.

The controller 410 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 4, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412. The memory 414 includes various actuation profiles corresponding to loading conditions experienced by the leveling system 100 and/or corresponding to modes of operation of the lift device 10, according to an exemplary embodiment. In some embodiments, controller 410 represents a collection of processing devices (e.g., servers, data centers, etc.). In such cases, the processing circuit 412 represents the collective processors of the devices, and the memory 414 represents the collective storage devices of the devices.

In one embodiment, the user interface 440 includes a display and an operator input. The display may be configured to display a graphical user interface, an image, an icon, and/or still other information. In one embodiment, the display includes a graphical user interface configured to provide general information about the left device (e.g., vehicle speed, fuel level, warning lights, battery level, etc.). The graphical user interface may also be configured to display a current position of the leveling system 100, a current position of the boom 40, a current position of the turntable 14, an orientation of the lift base 12 (e.g., angle relative to a ground surface, etc.), and/or still other information relating to the lift device 10 and/or the leveling system 100.

The operator input may be used by an operator to provide commands to at least one of the turntable 14, the boom 40, the leveling system 100, the drive system 220, and the actuator circuit 300. The operator input may include one or more buttons, knobs, touchscreens, switches, levers, joysticks, pedals, a steering wheel, or handles. The operator input may facilitate manual control of some or all aspects of the operation of the lift device 10. It should be understood that any type of display or input controls may be implemented with the systems and methods described herein.

According to an exemplary embodiment, the controller 410 is configured to send and receive displacement data from the displacement sensors 402, roll data from the roll sensors 404, pitch data from the pitch sensors 406, and/or load data from the load sensors 408. The displacement sensors 402 may be positioned to acquire the displacement data regarding the front right actuator 170, the front left actuator 180, the rear right actuator 190, and/or the rear left actuator 200. The displacement data may be indicative of an amount of displacement and/or a position (e.g., extension, retraction, etc.) of the front right actuator 170, the front left actuator 180, the rear right actuator 190, and/or the rear left actuator 200 (e.g., relative to a neutral position, a nominal position, etc.). The roll sensors 404 may be positioned to acquire the roll data regarding the front leveling assembly 110, the rear leveling assembly 120, the front axle 150, and/or the rear axle 160. The roll data may be indicative of a roll angle and/or a rate of change of the roll angle of the front axle 150 about the pin 158 and/or the rear axle 160 about the corresponding pin thereof (e.g., relative to a horizontal roll alignment, a zero roll angle, etc.). The pitch sensors 406 may be positioned to acquire the pitch data regarding the front leveling assembly 110, the rear leveling assembly 120, the front axle 150, and/or the rear axle 160. The pitch data may be indicative of a pitch angle and/or a rate of change of the pitch angle of the front axle 150 about the coupling between the chassis end 132 of the front trailing arm 130 and the front end 20 of the lift base 12 and/or the rear axle 160 about the coupling between the chassis end 142 of the rear trailing arm 140 and the rear end 30 of the lift base 12 (e.g., relative to a horizontal pitch alignment, a zero pitch angle, etc.). The load sensors 408 may be positioned to acquire the load data regarding the front tractive elements 16 and/or the rear tractive elements 18. The load data may be indicative of a loading experienced by each of the front tractive elements 16 and/or each of the rear tractive elements 18. According to an exemplary embodiment, the controller 410 monitors the leveling status, the ground following status, and/or the height of the lift base 12 of the lift device 10 using the displacement data, the roll data, the pitch data, and/or the load data.

According to an exemplary embodiment, the controller 410 is configured to facilitate operating the lift device in various modes of operation. The modes of operation of the lift device may include a transportation or stowed mode, a driving mode, a boom operation mode, and/or a calibration mode. The various modes of operation may be selected by an operator of the lift device 10 and/or automatically activated by the controller 410 based on the current operation of the lift device 10 (e.g., driving, operating the turntable 14, operating the boom 40, etc.). The controller 410 may actively control at least one of the front leveling assembly 110 and the rear leveling assembly 120 based on the mode of operation of the lift device 10. According to an exemplary embodiment, the controller 410 is configured to control operation of the front right actuator 170, the front left actuator 180, the rear right actuator 190, and/or the rear left actuator 200 based on at least one of the displacement data, the roll data, the pitch data, the load data, the mode of operation of the lift device 10, the operation of the turntable 14, and/or the operation of the boom 40.

According to an exemplary embodiment, the controller 410 is configured to provide a command to the leveling system 100 (e.g., the leveling modules 172, 182, 192, and 202, etc.) to reduce the overall height of the lift base 12 to a target height (e.g., a minimum height, a stowed height, a shipping height, etc.) in response to the lift device 10 being switched into the transportation or stowed mode (e.g., to provide a squatting capability, etc.). Such a reduction in the overall height of the lift device 10 may facilitate storing the lift device within an ISO container (e.g., containerization, etc.) and/or provide greater stability and clearance during transportation (e.g., by lowering the center of gravity thereof, etc.). In some embodiments, the controller 410 is configured to limit the speed of the lift device 10 and/or the operation of the turntable 14 and/or the boom 40 during the transportation mode.

According to an exemplary embodiment, the controller 410 is configured to provide a command to the leveling system 100 to calibrate the displacement sensors 402, the roll sensors 404, the pitch sensors 406, and/or the load sensors 408 when the lift device 10 is in the calibration mode. The calibration mode may be activated each time the lift device 10 is turned on, on a periodic basis, in response to an operator command, and/or in response to the various data indicating potential miscalibration. The calibration mode may include the leveling system 100, the turntable 14, and/or the boom 40 returning to a nominal position (e.g., fully extended, fully retracted, etc.) such that the sensors may be zeroed out.

According to an exemplary embodiment, the controller 410 is configured to actively control the rear leveling assembly 120 (e.g., based on the pitch data, the roll data, the displacement data, and/or the load data, etc.) and passively control the front leveling assembly 110 (e.g., as depicted in FIG. 11, etc.) in response to the lift device 10 being operated in the driving mode. In other embodiments, the front leveling assembly 110 is actively controlled, while the rear leveling assembly 120 is passively controlled when the lift device 10 is in the driving mode. The passive control of the front leveling assembly 110 may allow the front axle 150 to freely float and/or oscillate as the front tractive elements 16 encounter various terrain (e.g., slopes, pot holes, rocks, etc.) with the front right actuator 170 and the front left actuator 180 fluidly coupled (e.g., by the front low pressure line 340 and the auxiliary line 360, etc.). In one embodiment, the front axle 150 is allowed to freely float in the roll direction. In some embodiments, the front axle 150 is allowed to freely float in the roll direction and/or the pitch direction. The active control of the rear leveling assembly 120 (e.g., the rear right actuator 190, the rear left actuator 200, etc.) may facilitate the controller 410 in maintaining the lift base 12 level relative to gravity. In some embodiments, operation of the turntable 14 and/or the boom 40 are limited and/or disabled by the controller 410 during the driving mode. By way of example, limiting the use of the turntable 14 and/or the boom 40 may maintain a lower center of gravity of the lift device 10 such that the lift device 10 may operate at higher speeds with improved stability. According to an exemplary embodiment, the controller 410 actively controlling of the rear leveling assembly 120 and passively controlling the front leveling assembly 110 provides a smooth ground following capability and increased terrainability (e.g., terrain negotiation, etc.). The actuator circuit 300 may also require less power (e.g., requires less hydraulic flow from the pump 302, since only the two rear actuators are actively controlled, compared to actively controlling all four actuators, etc.) during the driving mode of the lift device 10.

According to an exemplary embodiment, the controller 410 is configured to actively control the front leveling assembly 110 and the rear leveling assembly 120 in response to the lift device 10 being operated in the boom operation mode (e.g., the turntable 14 and/or the boom 40 being operated, etc.). The active control of the rear leveling assembly 120 (e.g., the rear right actuator 190, the rear left actuator 200, etc.) and the front leveling assembly 110 (e.g., the front right actuator 170, the front left actuator 180, etc.) may facilitate the controller 410 in maintaining the lift base 12 level (e.g., move level, completely level, etc.) relative to gravity. In some embodiments, the controller 410 limits the speed of the lift device 10 during the boom operation mode. By way of example, operating the turntable 14 and/or the boom 40 may raise the center of gravity of the lift device 10 such that limiting the speed to lower operating speeds may facilitate increased stability. According to an exemplary embodiment, the controller 410 is configured to control operation of the front right actuator 170, the front left actuator 180, the rear right actuator 190, and the rear left actuator 200 based on at least one of the displacement data, the roll data, the pitch data, the load data, the position of the turntable 14, and/or the position of the boom 40 (e.g., the platform assembly 92, etc.) while the lift device 10 is in the boom operation mode. The boom operation mode may be used while the lift device 10 is stationary and/or moving (e.g., at a reduced speed, a governed speed, a creep speed, etc.). The various data may be used to maintain the lift base 12 level relative to gravity and/or maintain the front tractive elements 16 and the rear tractive elements 18 in contact with the ground as the center of gravity of the lift device 10 varies while in the boom operation mode (e.g., as the platform assembly 92 is selectively raised, lowered, extended, retracted, etc.).

Figure 13:
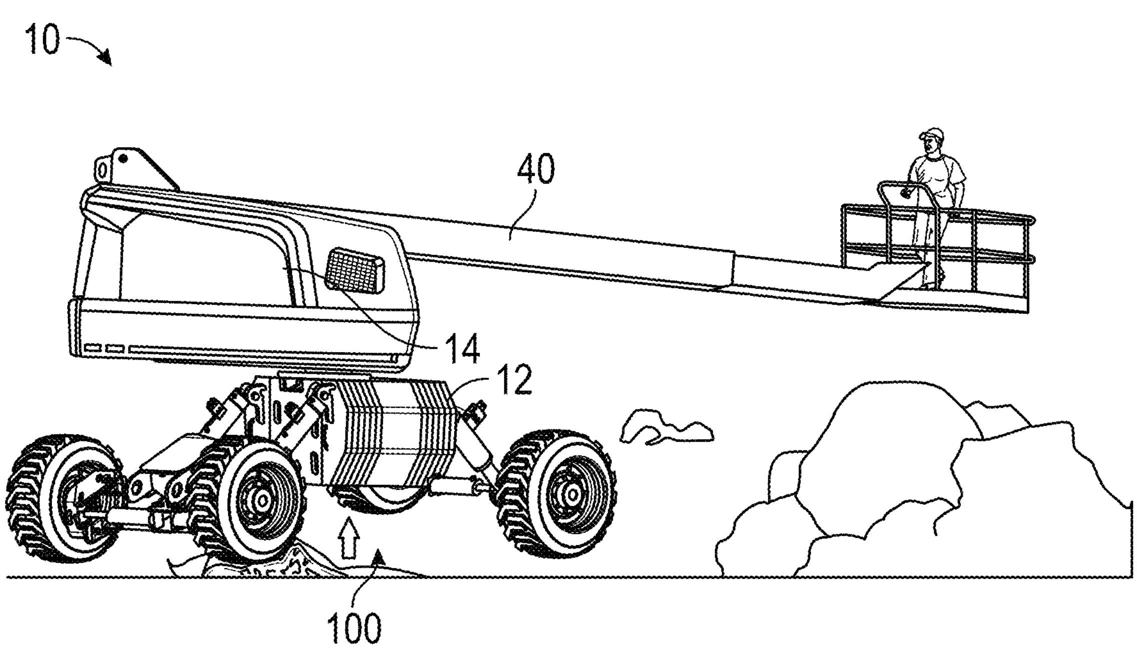
FIGS. 13-20 are illustrations of various modes of operation of the lift device of FIG. 1, according to various exemplary embodiments.
Figure 14:
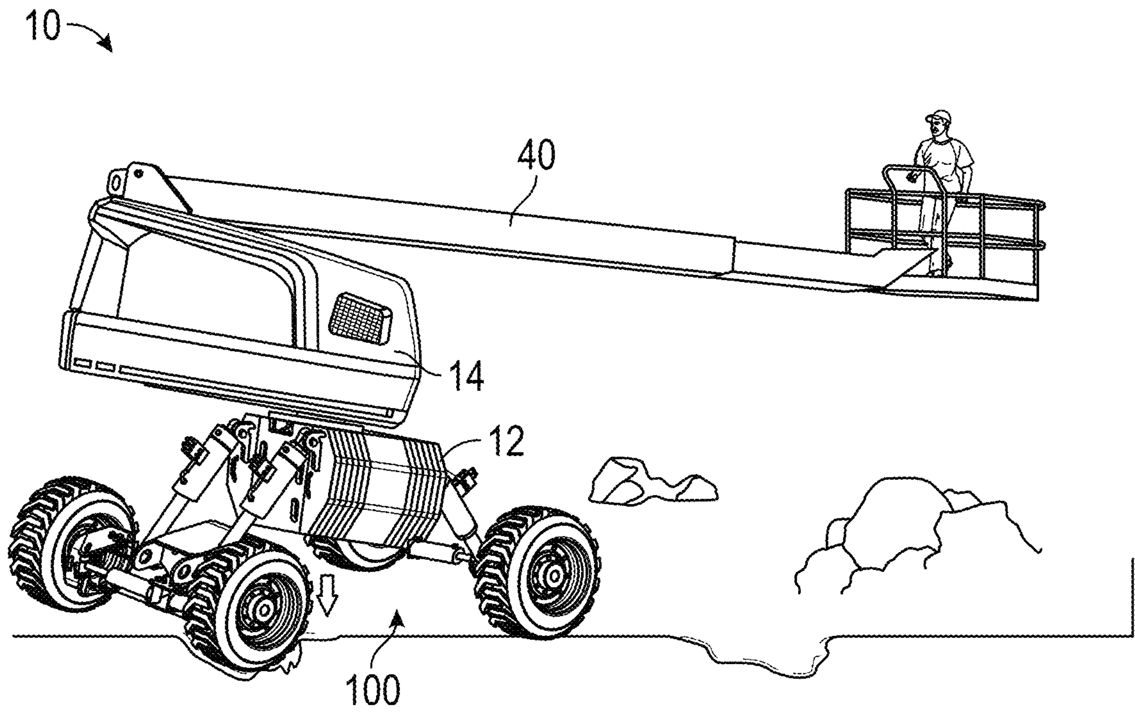
Figures 15, 16:
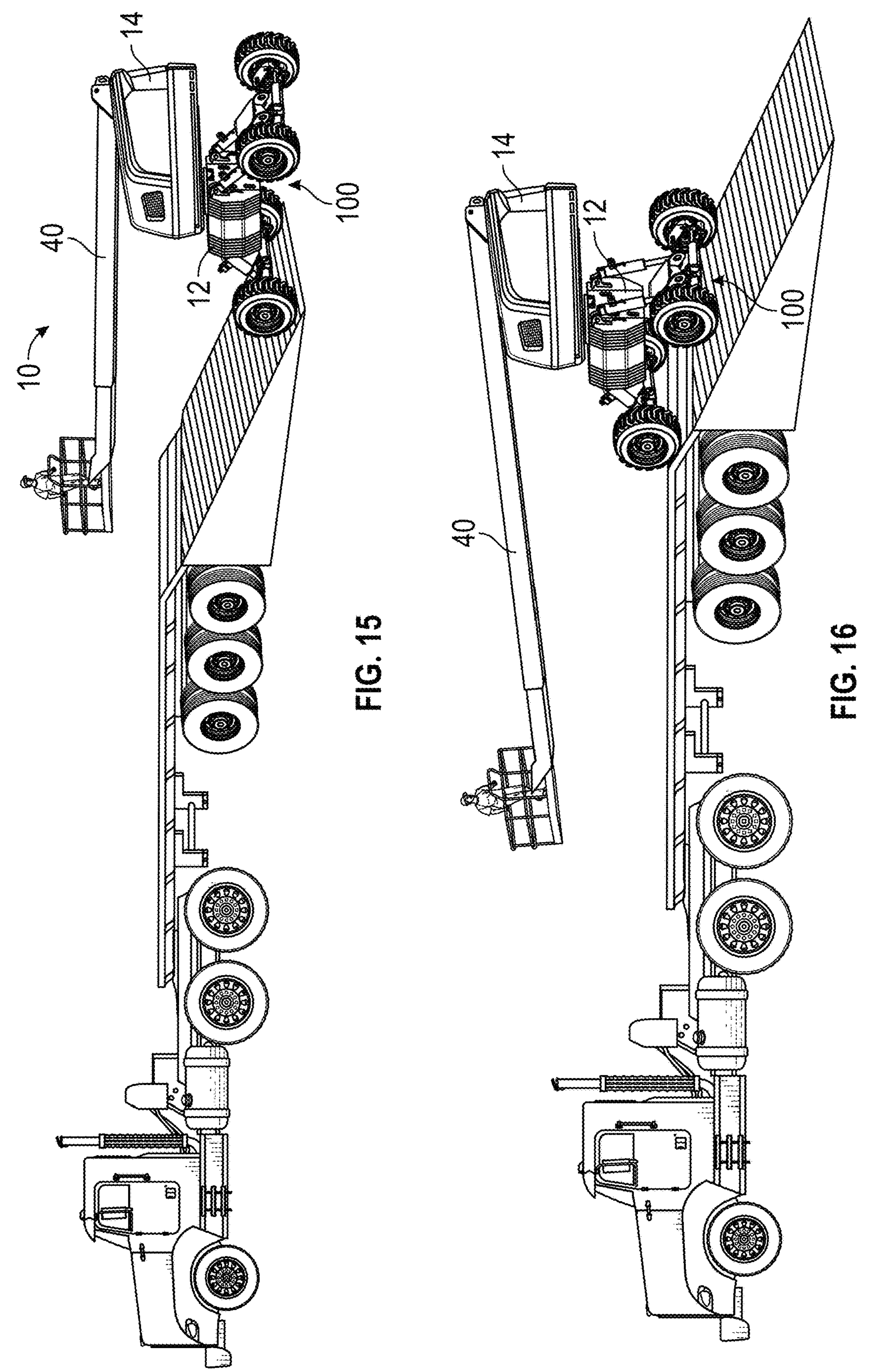
Figures 17, 18:
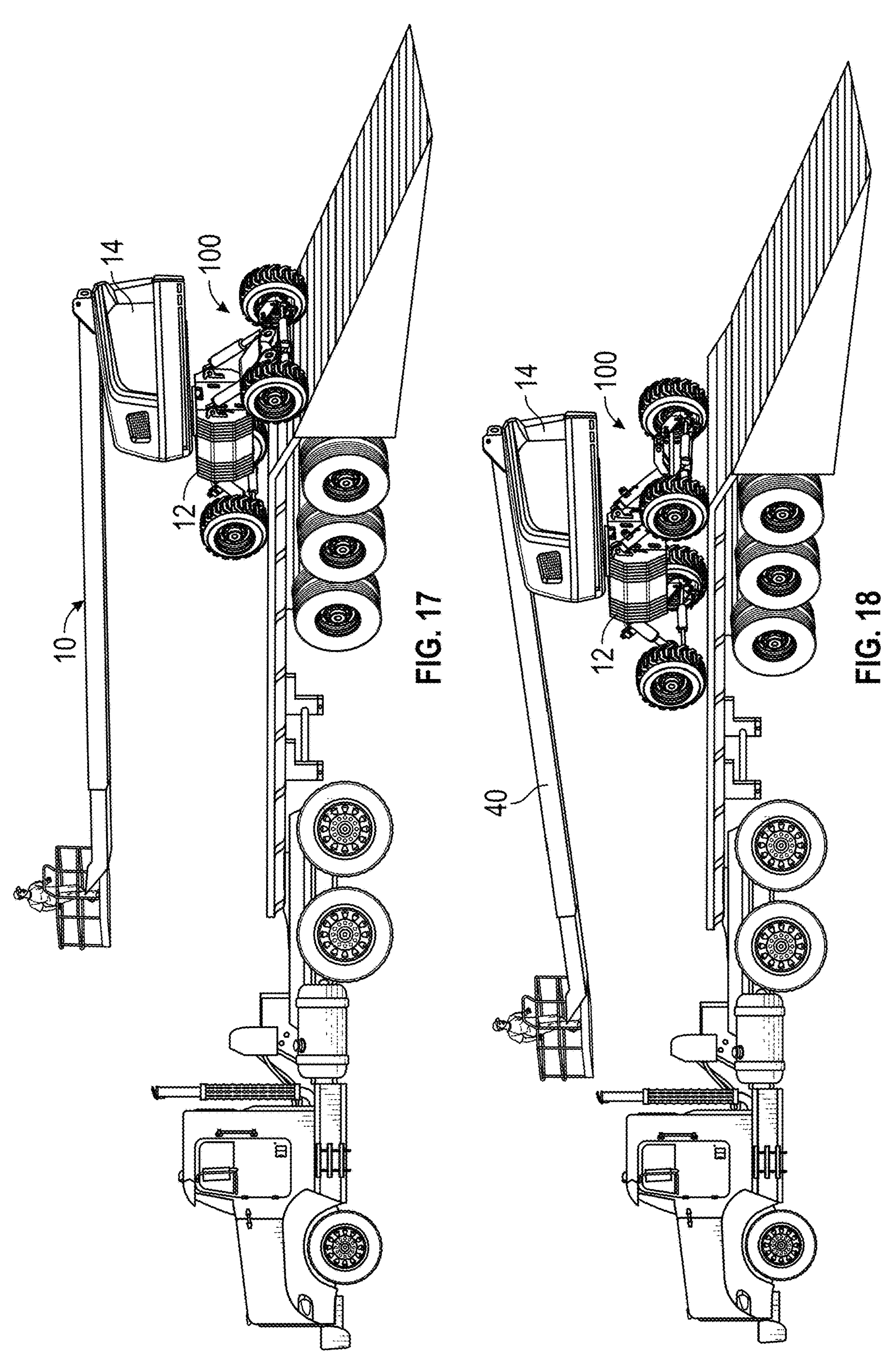
Figures 19, 20:
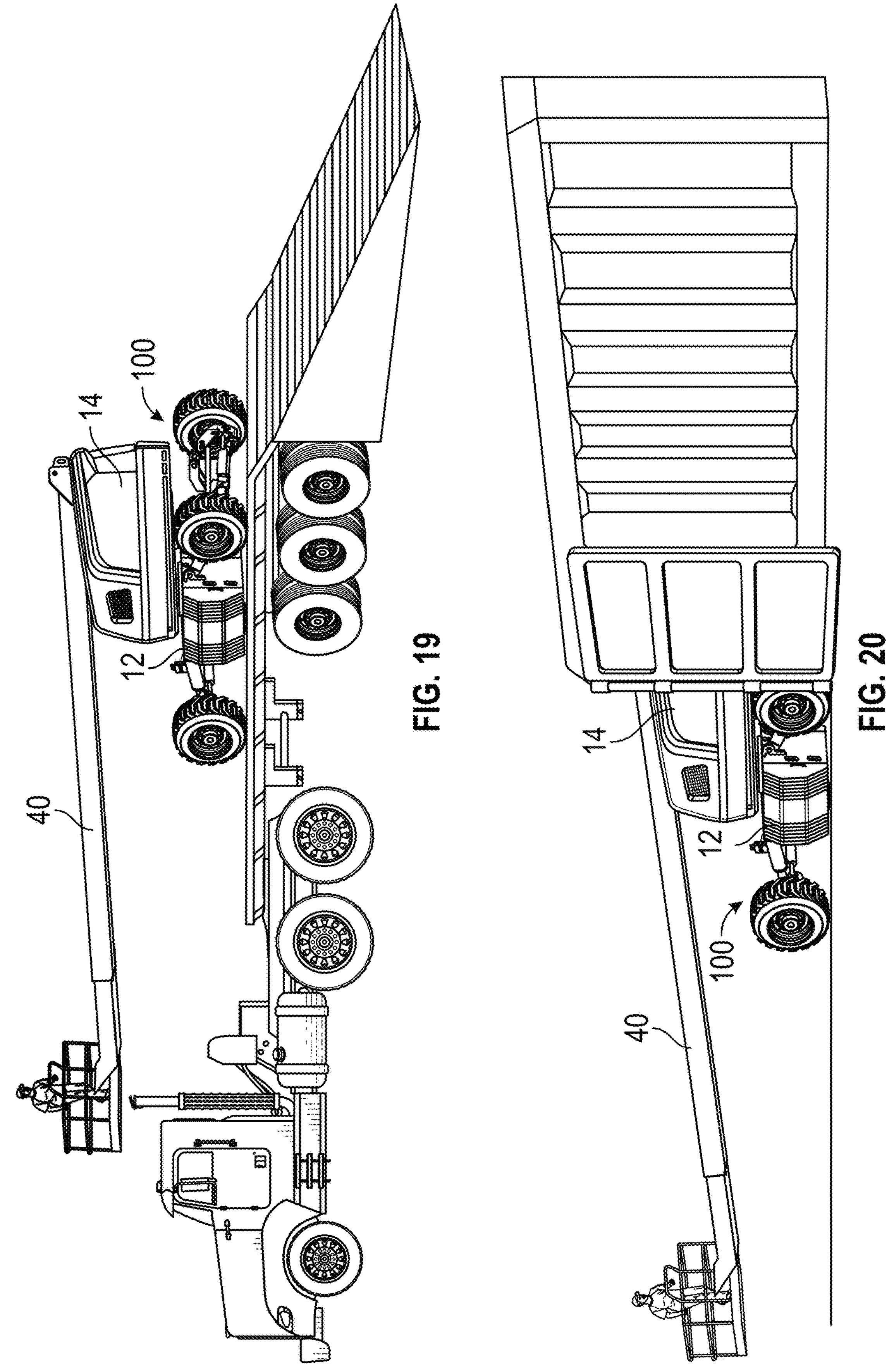

According to the exemplary embodiment shown in FIGS. 13-20, the lift device 10 is configured to operate (e.g., as controlled by the controller 410, etc.) in various modes (e.g., to negotiate various terrain or obstacles, facilitate transportation, etc.). As shown in FIGS. 13 and 14, the leveling system 100 of the lift device 10 is configured to increase the terrainability by increasing the capabilities of the lift device 10 to negotiate obstacles (e.g., pot holes, bumps, rocks, etc.), while maintaining the lift base 12, the turntable 14, and the boom 40 level relative to gravity (e.g., while operating in the driving mode, the boom operation mode, etc.). The leveling system 100 may additionally improve traction capabilities of the lift device 10 by distributing loads throughout the rear tractive elements 18 and/or the front tractive elements 16 while on and/or driving along uneven and/or sloped terrain. As shown in FIGS. 15-18, the leveling system 100 is configured to facilitate negotiation of and self-leveling on inclines or slopes, while maintaining the lift base 12, the turntable 14, and the boom 40 level relative to gravity (e.g., while operating in the driving mode, the boom operation mode, etc.). Such self-leveling may ease the loading of the lift device 10 onto a truck bed and/or increase the stability of the lift device 10 during operation of the boom 40 and/or the turntable 14 while on an incline or slope. As shown in FIGS. 19 and 20, the leveling system 100 is configured to facilitate a squatting capability such that the height of the lift base 12 is reduced. The squatting capability may provide greater stability and clearance while the lift device 10 is transported (e.g., via a truck, etc.) and/or facilitate containerization of the lift device 10 for shipping (e.g., by reducing the overall height of the lift device 10 such that the lift device 10 fits within an ISO container, etc.).

Figure 21:
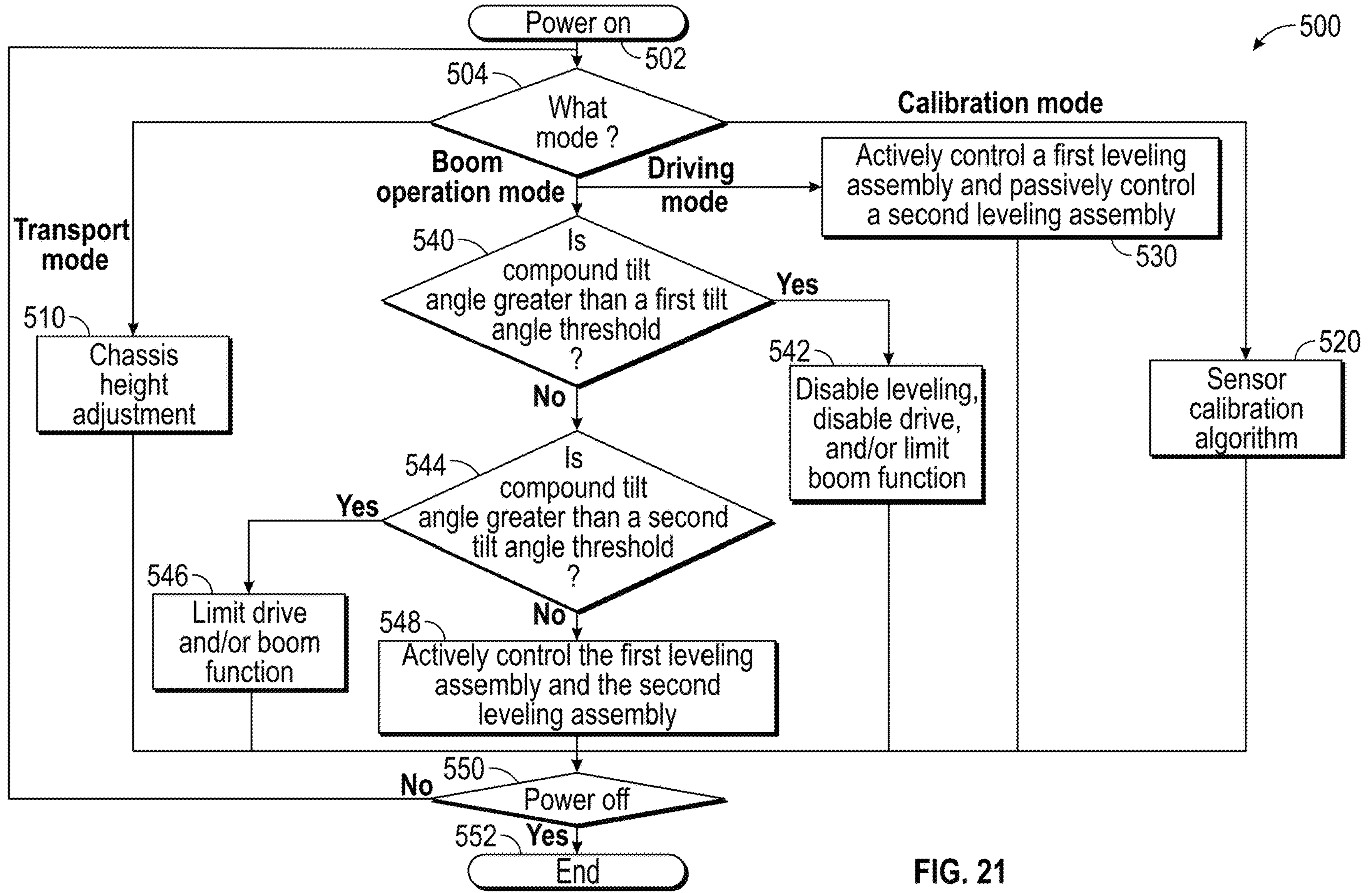
FIG. 21 is a flow diagram of a method for controlling a lift device according to various modes of operation, according to an exemplary embodiment.

Referring now to FIG. 21, a method for controlling the lift device 10 according to various modes of operation is shown according to an exemplary embodiment. At step 502, the lift device 10 is powered on (e.g., in response to receiving a power on command from an operator, etc.). At step 504, the controller 410 determines a mode of operation of the lift device 10 (e.g., transportation mode, calibration mode, driving mode, boom operation mode, etc.). The mode of operation may be manually operator selected, automatically initiated at power on, automatically initiated at power off, and/or automatically initiated in response to an operator input to drive the lift device 10, operate the turntable 14, and/or operate the boom 40. At step 510, the controller 410 is configured to provide a command to the leveling system 100 to adjust the height of the lift base 12 to a target height (e.g., a transportation height, a stowed height, etc.) in response to the initiation of a transport mode of operation. The transport mode of operation may be initiated in response to an operator selection and/or in response to the lift device 10 being powered off. In some embodiments, the controller 410 is configured to limit the speed of the lift device 10 and/or the operation of the turntable 14 and/or the boom 40 during the transportation mode of operation. At step 520, the controller 410 is configured to provide a command to the leveling system 100 to run a sensor calibration algorithm to facilitate calibrating one or more sensors of the lift device 10 (e.g., the displacement sensors 402, the roll sensors 404, the pitch sensors 406, the load sensors 408, etc.) in response to the initiation of a calibration mode of operation. The calibration mode of operation may be initiated each time the lift device 10 is turned on, on a periodic basis, in response to an operator command, and/or in response to the various data indicating potential miscalibration. The sensor calibration algorithm may include the leveling system 100, the turntable 14, and/or the boom 40 returning to a nominal position (e.g., fully extended, fully retracted, etc.) such that the sensors may be zeroed out.

At step 530, the controller 410 is configured to actively control a first leveling assembly (e.g., the rear leveling assembly 120, etc.) and passively control a second leveling assembly (e.g., the front leveling assembly 110, etc.) of the leveling system 100 in response to initiation of the driving mode of operation. The driving mode may be initiated in response to an operator providing a command to drive the lift device 10 while the boom 40 is in a stowed position and/or a boom operation mode. According to an exemplary embodiment, the controller 410 is configured to control the first leveling assembly based on data (e.g., pitch data, roll data, the displacement data, the load data, etc.) received from the one or more sensors (e.g., the displacement sensors 402, the roll sensors 404, the pitch sensors 406, the load sensors 408, etc.). In some embodiments, the controller 410 is configured to limit and/or disable operation of the turntable 14 and/or the boom 40 while the lift device 10 is in the driving mode.

At step 540, the controller 410 is configured to determine a compound tilt angle (e.g., a combination of the roll angle and the pitch angle, etc.) of the lift device 10 and compare the compound tilt angle to a first tilt angle threshold in response to the initiation of a boom operation mode. The boom operation mode may be initiated in response to an operator providing a command to operate the turntable 14 and/or the boom 40 of the lift device 10. According to an exemplary embodiment, the first tilt angle threshold is five degrees. In other embodiments, the first tilt angle threshold is less than or greater than five degrees (e.g., four degrees, six degrees, seven degrees, etc.). If the compound tilt angle is greater than the first tilt angle threshold, the controller 410 is configured to disable the leveling function, disable the drive function, and/or limit boom function (step 542). If the compound tilt angle is less than the first tilt angle threshold, the controller 410 is configured to compare the compound tilt angle to a second tilt angle threshold (step 544). According to an exemplary embodiment, the second tilt angle threshold is three degrees. In other embodiments, the second tilt angle threshold is less than or greater than three degrees (e.g., four degrees, two degrees, five degrees, etc.). If the compound tilt angle is greater than the second tilt angle threshold, but less than the first tilt angle threshold, the controller 410 is configured to limit drive function (e.g., to a creep speed, a reduced speed, etc.) and/or limit boom function (step 546). If the compound tilt angle is less than the second tilt angle threshold, the controller 410 is configured to provide a command to actively control the first leveling assembly (e.g., the rear leveling assembly 120, etc.) and the second leveling assembly (e.g., the front leveling assembly 110, etc.) of the leveling system 100 (step 548). According to an exemplary embodiment, the controller 410 is configured to control the first leveling assembly and the second leveling assembly based on (i) data (e.g., pitch data, roll data, load data, displacement data etc.) received from the one or more sensors (e.g., the displacement sensors 402, the roll sensors 404, the pitch sensors 406, the load sensors 408, etc.), (ii) the operation of the boom 40 (e.g., the position of the platform assembly 92 relative to the lift base 12, etc.), and/or (iii) the operation of the turntable 14 (e.g., rotation thereof, etc.). At step 550, the controller 410 is configured to power off the lift device 10 (e.g., in response to receiving a power off command from an operator, etc.). At step 552, the method 500 is concluded until a subsequent power on command is received (step 502).

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

The invention claimed is:

1. A machine comprising:

a base having a front end and a rear end;

a first assembly pivotably coupled to the front end of the base, the first assembly including a first tractive element, a second tractive element, and a first axle coupled to and extending from the first tractive element;

a second assembly pivotably coupled to the rear end of the base, the second assembly including a third tractive element and a second axle coupled to and extending from the third tractive element;

a first actuator comprising a first actuator end and a second actuator end, the first actuator end directly coupled to a frontmost wall of the front end of the base, and the second actuator end directly coupled to the first assembly along the first axle;

a second actuator comprising a third actuator end and a fourth actuator end, the third actuator end directly coupled to a rearmost wall of the rear end of the base, and the fourth actuator end directly coupled to the second assembly along the second axle; and a third actuator coupled to the frontmost wall of the front end of the base and the first assembly.

2. The machine of claim 1, further comprising a boom coupled to the base.

3. The machine of claim 2, further comprising a turntable coupled to the base, wherein the boom is coupled to the turntable.

4. The machine of claim 1, wherein the first actuator and the third actuator are selectively fluidly couplable to each other and selectively fluidly decouplable from each other.

5. The machine of claim 1, wherein the first tractive element is spaced entirely forward of the frontmost wall of the base.

6. The machine of claim 5, wherein the third tractive element is spaced entirely rearward of the rearmost wall of the base.

* * * * *